(12) United States Patent
Miller et al.

(10) Patent No.: US 8,505,361 B2
(45) Date of Patent: Aug. 13, 2013

(54) LEAK DETECTION IN VACUUM BAGS

(75) Inventors: Finley B. Miller, Huntington Beach, CA (US); Michael E. Benne, St. Paul, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/906,489

(22) Filed: Oct. 18, 2010

(65) Prior Publication Data

US 2011/0079174 A1 Apr. 7, 2011

Related U.S. Application Data

(62) Division of application No. 11/829,900, filed on Jul. 28, 2007, now Pat. No. 7,849,729.

(60) Provisional application No. 60/876,928, filed on Dec. 22, 2006.

(51) Int. Cl.
*G01M 3/34* (2006.01)

(52) U.S. Cl.
USPC ............................................ 73/49.3

(58) Field of Classification Search
USPC ............... 73/49.3; 164/571; 436/3
See application file for complete search history.

(56) References Cited

U.S. PATENT DOCUMENTS

| | | | |
|---|---|---|---|
| 2,374,894 A | 5/1945 | Pioch et al. | |
| 2,679,278 A | 5/1954 | Clark | |
| 3,739,166 A | 6/1973 | Anderson | |
| 3,983,282 A | 9/1976 | Seemann, III | |
| 4,015,035 A | 3/1977 | Blad et al. | |
| 4,016,022 A | 4/1977 | Browning et al. | |
| 4,120,632 A | 10/1978 | Stoeberl | |
| 4,132,755 A | 1/1979 | Johnson | |
| 4,208,238 A | 6/1980 | August et al. | |
| 4,238,539 A | 12/1980 | Yates et al. | |
| 4,287,015 A | 9/1981 | Danner, Jr. | |
| 4,476,797 A | 10/1984 | Ivanov et al. | |
| 4,491,081 A | 1/1985 | Ivanov | |
| 4,491,493 A | 1/1985 | Eaton | |

(Continued)

FOREIGN PATENT DOCUMENTS

| DE | 102004046520 A1 | 4/2005 |
|---|---|---|
| EP | 0230682 A2 | 8/1987 |

(Continued)

OTHER PUBLICATIONS

UK Search and Examination Report dated Jul. 15, 2011, regarding Application No. GB1104472.4.

(Continued)

*Primary Examiner* — Hezron E Williams
*Assistant Examiner* — Nathaniel Kolb
(74) *Attorney, Agent, or Firm* — Yee & Associates, P.C.

(57) ABSTRACT

Air leaks in a vacuum bag are detected using a leak detection film covering the inside face of the bag. The film includes a gas permeable binder carrying oxygen sensitive material that changes in physical appearance at the location of an air leak. The film may be adhered to the inside face of the bag or may form a separate membrane that is placed over a layup being molded in the bag. The film may be illuminated with light having a wavelength selected to cause the film to luminesce.

23 Claims, 16 Drawing Sheets

(56) References Cited

U.S. PATENT DOCUMENTS

| | | |
|---|---|---|
| 4,496,412 A | 1/1985 | Ritter |
| 4,548,859 A | 10/1985 | Kline et al. |
| 4,554,036 A | 11/1985 | Newsom |
| 4,564,543 A | 1/1986 | Ritter |
| 4,588,626 A | 5/1986 | Cologna et al. |
| 4,622,091 A | 11/1986 | Letterman |
| 4,698,115 A | 10/1987 | Dodds |
| 4,741,943 A | 5/1988 | Hunt |
| 4,824,513 A | 4/1989 | Dodds |
| 4,875,962 A | 10/1989 | Breakspear |
| 4,902,215 A | 2/1990 | Seemann, III |
| 4,917,353 A | 4/1990 | Riley |
| 4,934,199 A | 6/1990 | Avila et al. |
| 4,942,013 A | 7/1990 | Palmer et al. |
| 4,945,488 A | 7/1990 | Carver et al. |
| 4,961,799 A | 10/1990 | Cologna et al. |
| 5,033,014 A | 7/1991 | Carver et al. |
| 5,034,254 A | 7/1991 | Colgona et al. |
| 5,052,906 A | 10/1991 | Seemann |
| 5,071,338 A | 12/1991 | Dublinski et al. |
| 5,087,193 A | 2/1992 | Herbert, Jr. |
| 5,116,216 A | 5/1992 | Cochran et al. |
| 5,123,985 A | 6/1992 | Evans et al. |
| 5,129,813 A | 7/1992 | Shepherd |
| 5,167,742 A | 12/1992 | Peters |
| 5,180,046 A | 1/1993 | Hutton et al. |
| 5,190,611 A | 3/1993 | Cologna et al. |
| 5,207,541 A | 5/1993 | Westerman et al. |
| 5,290,386 A | 3/1994 | Trudeau |
| 5,316,462 A | 5/1994 | Seemann |
| 5,359,887 A | 11/1994 | Schwab et al. |
| 5,364,584 A | 11/1994 | Imanara et al. |
| 5,427,518 A | 6/1995 | Morizot et al. |
| 5,427,725 A | 6/1995 | White et al. |
| 5,429,326 A | 7/1995 | Garesche et al. |
| 5,439,635 A | 8/1995 | Seemann |
| 5,441,692 A | 8/1995 | Taricco |
| 5,514,232 A | 5/1996 | Burns |
| 5,576,030 A | 11/1996 | Hooper |
| 5,601,852 A | 2/1997 | Seemann |
| 5,612,492 A | 3/1997 | Schwab et al. |
| 5,667,881 A | 9/1997 | Rasmussen et al. |
| 5,683,646 A | 11/1997 | Reiling, Jr. |
| 5,702,663 A | 12/1997 | Seemann |
| 5,721,034 A | 2/1998 | Seemann, III et al. |
| 5,759,325 A | 6/1998 | Davis |
| 5,780,721 A | 7/1998 | Levens |
| 5,820,894 A | 10/1998 | Kreutzer |
| 5,879,489 A | 3/1999 | Burns et al. |
| 5,882,756 A | 3/1999 | Alston et al. |
| 5,904,972 A | 5/1999 | Tunis, III et al. |
| 5,932,256 A | 8/1999 | Mandish |
| 5,939,013 A | 8/1999 | Han et al. |
| 5,954,898 A | 9/1999 | McKague et al. |
| 5,958,325 A | 9/1999 | Seemann, III et al. |
| 6,090,335 A | 7/2000 | McClure et al. |
| 6,096,164 A | 8/2000 | Benson et al. |
| 6,206,067 B1 | 3/2001 | Kociemba et al. |
| 6,211,497 B1 | 4/2001 | Matsen et al. |
| 6,284,089 B1 | 9/2001 | Anderson et al. |
| 6,298,896 B1 | 10/2001 | Sherrill et al. |
| 6,299,819 B1 | 10/2001 | Han |
| 6,391,246 B2 | 5/2002 | Shiraishi et al. |
| 6,391,436 B1 | 5/2002 | Xu et al. |
| 6,406,659 B1 | 6/2002 | Lang et al. |
| 6,408,517 B1 | 6/2002 | Lehmker et al. |
| 6,461,551 B1 | 10/2002 | Mandish |
| 6,533,985 B1 | 3/2003 | Smith |
| 6,551,091 B1 | 4/2003 | Bryant et al. |
| 6,575,218 B1 | 6/2003 | Burns et al. |
| 6,579,418 B2 | 6/2003 | Lindsay et al. |
| 6,589,472 B1 | 7/2003 | Benson et al. |
| 6,638,466 B1 | 10/2003 | Abbott |
| 6,689,438 B2 | 2/2004 | Kennedy et al. |
| 6,696,690 B2 | 2/2004 | Benne |
| 6,761,783 B2 | 7/2004 | Keller et al. |
| 6,797,390 B2 | 9/2004 | Asai et al. |
| 6,808,143 B2 | 10/2004 | Munk et al. |
| 6,830,079 B1 | 12/2004 | Ahrens et al. |
| 6,860,957 B2 | 3/2005 | Sana et al. |
| 6,919,039 B2 | 7/2005 | Lang et al. |
| 7,029,267 B2 | 4/2006 | Caron |
| 7,127,950 B2 | 10/2006 | Fonov et al. |
| 7,137,182 B2 | 11/2006 | Nelson |
| 7,141,191 B2 | 11/2006 | Engwall et al. |
| 7,186,367 B2 | 3/2007 | Hou et al. |
| 7,228,611 B2 | 6/2007 | Anderson et al. |
| 7,294,220 B2 | 11/2007 | Anderson |
| 7,306,450 B2 | 12/2007 | Hanson |
| 7,398,586 B2 | 7/2008 | Prichard et al. |
| 7,398,698 B2 | 7/2008 | Griess et al. |
| 7,413,694 B2 | 8/2008 | Waldrop, III et al. |
| 7,503,368 B2 | 3/2009 | Chapman et al. |
| 7,527,759 B2 | 5/2009 | Lee et al. |
| 7,534,615 B2 | 5/2009 | Havens |
| 7,622,066 B2 | 11/2009 | Brustad et al. |
| 7,624,488 B2 | 12/2009 | Lum et al. |
| 7,628,879 B2 | 12/2009 | Ackerman |
| 7,655,168 B2 | 2/2010 | Jones et al. |
| 7,762,122 B2 | 7/2010 | Advani et al. |
| 7,849,729 B2 | 12/2010 | Miller et al. |
| 7,871,040 B2 | 1/2011 | Lee et al. |
| 7,963,038 B2 | 6/2011 | Schmitz |
| 8,003,034 B2 | 8/2011 | Oldani et al. |
| 8,114,673 B2 | 2/2012 | Mills et al. |
| 2002/0060018 A1 | 5/2002 | Lindsay et al. |
| 2003/0082321 A1* | 5/2003 | Kennedy et al. ............ 428/35.7 |
| 2003/0175511 A1 | 9/2003 | Asai et al. |
| 2004/0026025 A1 | 2/2004 | Sana et al. |
| 2004/0258562 A1 | 12/2004 | Mills et al. |
| 2005/0086916 A1* | 4/2005 | Caron ............................ 55/382 |
| 2005/0102814 A1 | 5/2005 | Anderson et al. |
| 2005/0112772 A1 | 5/2005 | Farone et al. |
| 2005/0161154 A1 | 7/2005 | Anderson |
| 2005/0236735 A1 | 10/2005 | Oldani et al. |
| 2005/0253309 A1* | 11/2005 | Hou et al. .................... 264/571 |
| 2006/0108058 A1 | 5/2006 | Chapman et al. |
| 2006/0118235 A1 | 6/2006 | Lum et al. |
| 2006/0121613 A1* | 6/2006 | Havens ............................ 436/3 |
| 2007/0029527 A1 | 2/2007 | Mills et al. |
| 2007/0107189 A1 | 5/2007 | Prichard et al. |
| 2007/0272582 A1 | 11/2007 | Lau |
| 2007/0289246 A1 | 12/2007 | Schmitz |
| 2008/0111024 A1 | 5/2008 | Lee et al. |
| 2008/0148817 A1 | 6/2008 | Miller et al. |
| 2009/0145545 A1 | 6/2009 | Brennan et al. |
| 2009/0148647 A1 | 6/2009 | Jones et al. |
| 2009/0273107 A1 | 11/2009 | Advani et al. |
| 2009/0320292 A1 | 12/2009 | Brennan et al. |
| 2010/0011580 A1 | 1/2010 | Brennan et al. |
| 2010/0012260 A1 | 1/2010 | Brennan et al. |
| 2010/0078126 A1 | 4/2010 | Brennan et al. |
| 2010/0170326 A1 | 7/2010 | Miller et al. |
| 2011/0259086 A1 | 10/2011 | Harris et al. |
| 2011/0259515 A1 | 10/2011 | Rotter et al. |

FOREIGN PATENT DOCUMENTS

| | | |
|---|---|---|
| EP | 0271263 A2 | 6/1988 |
| EP | 0319449 A2 | 6/1989 |
| EP | 0348831 A2 | 1/1990 |
| EP | 0391641 A2 | 10/1990 |
| EP | 0391641 B1 | 8/1994 |
| EP | 0629497 A3 | 3/1995 |
| EP | 0816438 A2 | 1/1998 |
| EP | 1038656 A1 | 9/2000 |
| EP | 1780120 A2 | 5/2007 |
| EP | 1995044 A2 | 11/2008 |
| EP | 1995045 A2 | 11/2008 |
| EP | 2067611 A1 | 6/2009 |
| EP | 2383106 A1 | 2/2011 |
| EP | 2383559 A1 | 4/2011 |
| EP | 2444240 A1 | 4/2012 |
| GB | 2478848 A | 9/2011 |
| JP | 60252235 A | 12/1985 |

| | | | |
|---|---|---|---|
| JP | 62259059 | A | 11/1987 |
| JP | 2004309379 | A | 11/2004 |
| KR | 19970058260 | | 11/1997 |
| WO | 9322127 | A1 | 11/1993 |
| WO | 0176892 | A1 | 10/2001 |
| WO | 02099416 | A1 | 12/2002 |
| WO | 03021252 | A1 | 3/2003 |
| WO | 2004031321 | A1 | 4/2004 |
| WO | 2005056391 | A2 | 6/2005 |
| WO | 2005059500 | A1 | 6/2005 |
| WO | 2006110627 | A1 | 10/2006 |
| WO | 2006118692 | A1 | 11/2006 |
| WO | 2008054499 | A2 | 5/2008 |
| WO | 2008088435 | A1 | 7/2008 |
| WO | 2010025376 | A1 | 3/2010 |

OTHER PUBLICATIONS

Lee et al., "Novel UV-Activated Colorimetric Oxygen Indicator," Chemistry of Materials, vol. 17, No. 10, May 2005, pp. 2744-2751.
Buckingham et al., "Automating the manufacture of composite broadgoods," Composites, vol. 27A, No. 3, pp. 191-200, Mar. 1996.
Campbell (Ed.), "Ply Collation: A Major Cost Driver," In: Manufacturing Processes for Advanced Composites, Elsevier Advanced Technology, Oxford, UK, pp. 131-173, 2004.
Jayaweera et al., "Adaptive robotic assembly of compliant aerostructure components," Robotics and Computer-Integrated Manufacturing, vol. 23, No. 2, pp. 180-194, Jan. 2007.
International Search Report dated May 29, 2008 regarding Application No. PCT/US2007/023455 (WO2008088435), 3 pages.
European Search Report dated Mar. 2, 2009 regarding Application No. EP08171011 (EP2067611), 2 pages.
International Search Report dated Feb. 1, 2010 regarding Application No. PCT/US2009/055378 (WO2010025376), 3 pages.
European Search Report dated Sep. 15, 2011 regarding Application No. EP11160866 (EP2383106), 4 pages.
European Search Report dated Mar. 2, 2012 regarding Application No. EP12151305 (EP2444240), 2 pages.
El Amin, "Nano ink indicates safety breach in food packaging," http://www.foodproductiondaily.com/Quality-Safety/Nano-ink-indicates-safety-breach-in-food-packaging, Nov. 14, 2006, 2 pages.
European Search Report, dated Sep. 30, 2011, regarding Application No. EP11160843 (EP2383559), 7 pages.
Lee et al., "Novel UV-Activated Colorimetric Oxygen Indicator," Chemistry of Materials, vol. 17, No. 10, May 2005, pp. 2744-2751. (Abstract).
Mills et al., "UV-Activated Luminescence/Colourimetric O2 Indicator," International Journal of Photoenergy, vol. 2008, 2008, 6 pages.
Setnescu et al., "Polymer Films Doped with Colorants as Oxygen Sensitive Materials," Journal of Optoelectrics and Advanced Materials, vol. 8, No. 2, Apr. 2006, pp. 682-686.
Notice of Allowance, dated Sep. 21, 2012, regarding USPTO U.S. Appl. No. 12/725,380, 19 pages.
Office Action, dated Oct. 24, 2012, regarding USPTO U.S. Appl. No. 11/952,222, 39 pages.
Final Office Action, dated Nov. 16, 2012, regarding USPTO U.S. Appl. No. 12/764,202, 31 pages.
Brennan et al., "Compaction of Prepreg Plies on Composite Laminate Structures," USPTO U.S. Appl. No. 13/657,137 and Preliminary Amendment, filed Oct. 22, 2012, 37 pages.
USPTO Office Action, dated Apr. 26, 2012, regarding U.S. Appl. No. 12/764,202, 13 pages.
Korean Intellectual Property Office Notice of Office Action dated Jun. 11, 2010, regarding Application No. 200847564, 9 pages.
Korean Intellectual Property Office Notice of Office Action dated Jun. 21, 2010, regarding Application No. 200847566, 14 pages.
USPTO Office Action dated Apr. 13, 2011 regarding U.S. Appl. No. 11/751,928, 19 pages.
USPTO Final Office Action dated Jun. 23, 2011 regarding U.S. Appl. No. 11/751,928, 11 pages.
USPTO Office Action dated Jan. 19, 2012 regarding U.S. Appl. No. 11/751,928, 13 pages.
USPTO Office Action dated Mar. 10, 2010 regarding U.S. Appl. No. 11/829,900, 10 pages.
Reponse to Office Action dated Jul. 12, 2010 regarding U.S. Appl. No. 11/829,900, 24 pages.
USPTO Notice of Allowance dated Jul. 30, 2010 regarding U.S. Appl. No. 11/829,900, 8 pages.
USPTO Office Action dated Jun. 2, 2010 regarding U.S. Appl. No. 11/751,931, 15 pages.
USPTO Final Office Action dated Aug. 11, 2010 regarding U.S. Appl. No. 11/751,931, 29 pages.
USPTO Office Action dated May 20, 2011 regarding U.S. Appl. No. 11/751,931, 31 pages.
USPTO Final Office Action dated Sep. 28, 2011 regarding U.S. Appl. No. 11/751,931, 24 pages.
USPTO Office Action dated Oct. 26, 2010 regarding U.S. Appl. No. 11/952,222, 20 pages.
USPTO Final Office Action dated Apr. 15, 2011 regarding U.S. Appl. No. 11/952,222, 20 pages.
USPTO Office Action dated Oct. 3, 2011 regarding U.S. Appl. No. 11/952,222, 21 pages.
USPTO Final Office Action dated Apr. 30, 2012 regarding U.S. Appl. No. 11/952,222, 25 pages.
USPTO Office Action dated May 17, 2010 regarding U.S. Appl. No. 12/200,882, 9 pages.
USPTO Final Office Action dated Oct. 26, 2010 regarding U.S. Appl. No. 12/200,882, 8 pages.
USPTO Office Action dated Jul. 27, 2010 regarding U.S. Appl. No. 12/242,477, 13 pages.
USPTO Final Office Action dated Dec. 2, 2010 regarding U.S. Appl. No. 12/242,477, 15 pages.
USPTO Office Action dated Nov. 14, 2011 regarding U.S. Appl. No. 12/768,007, 20 pages.
USPTO Final Office Action, dated Jun. 20, 2012, regarding U.S. Appl. No. 11/751,928, 20 pages.
USPTO Final Office Action, dated May 3, 2012, regarding U.S. Appl. No. 12/768,007, 29 pages.
USPTO Notice of Allowance, dated Jul. 5, 2012, regarding U.S. Appl. No. 12/242,477, 9 pages.
Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article, English translation attached).

* cited by examiner

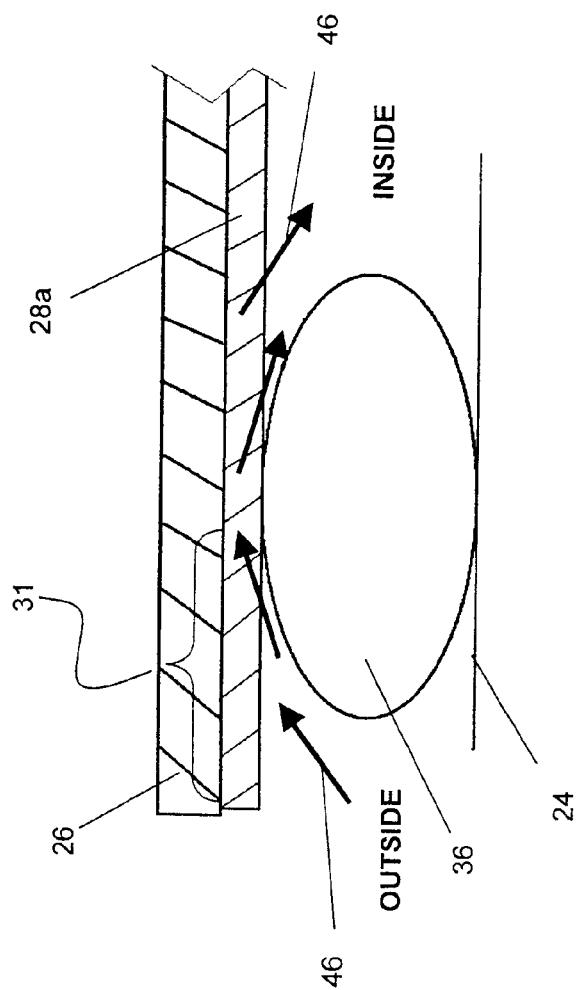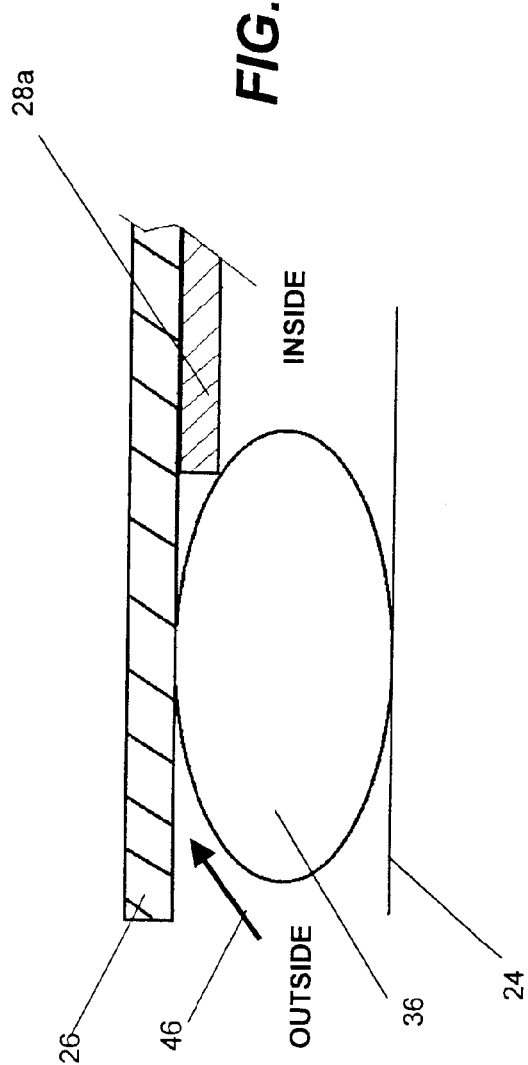

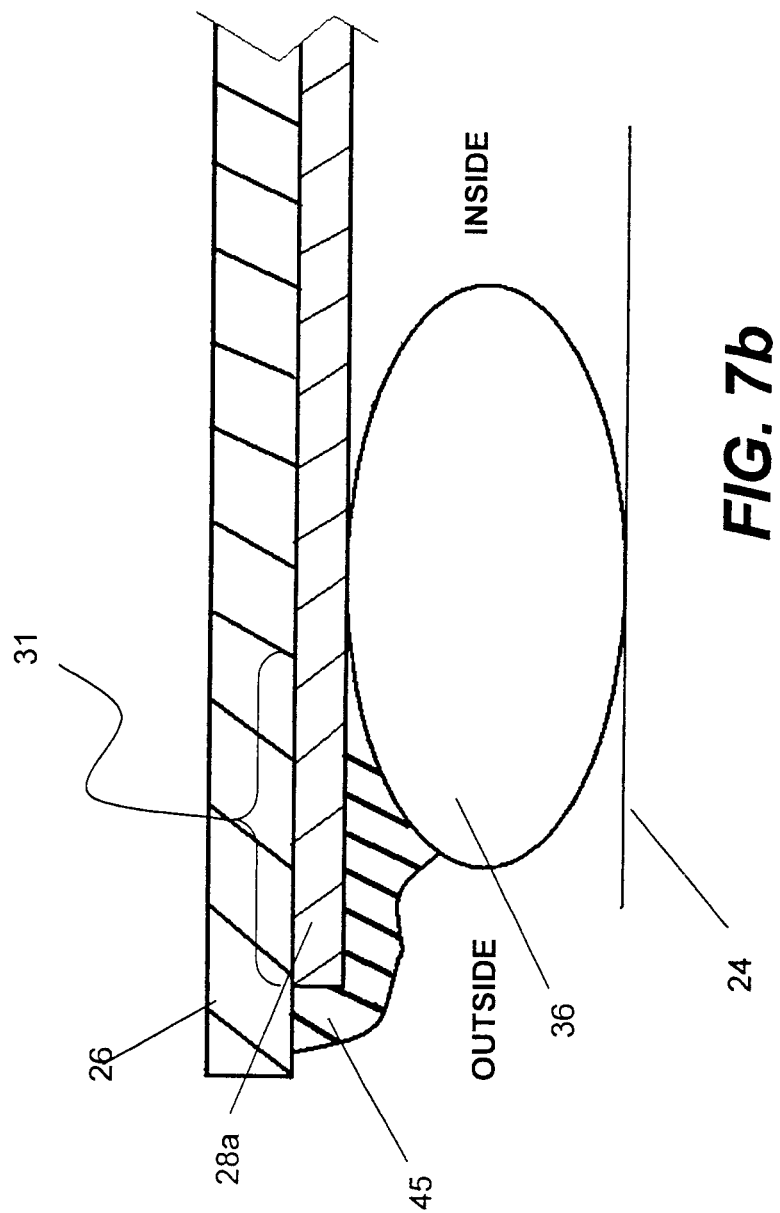

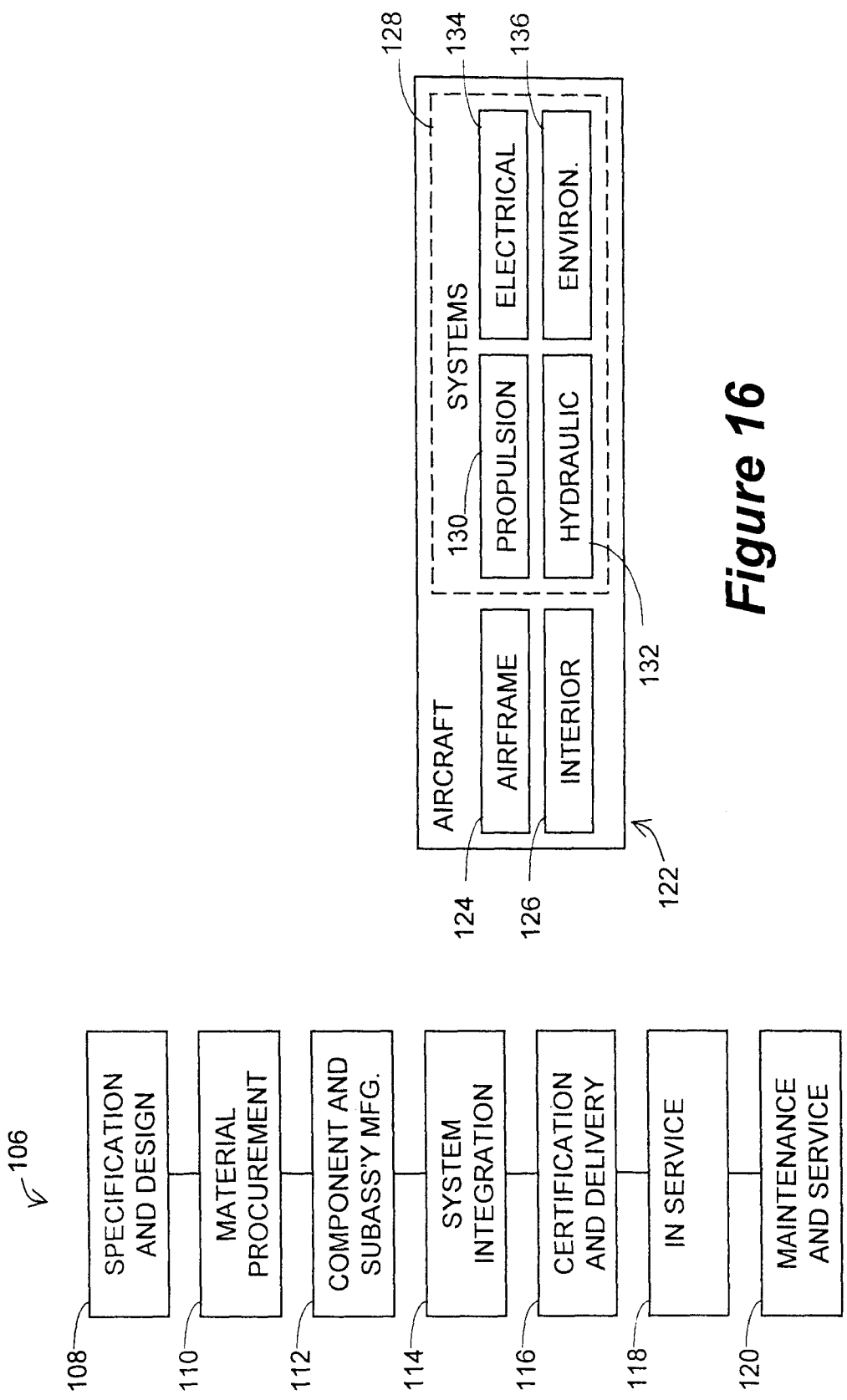

LEAK DETECTION IN VACUUM BAGS

This application is a divisional application of U.S. patent application Ser. No. 11/829,900, filed Jul. 28, 2007, now U.S. Pat. No. 7,849,729, issued Dec. 14, 2010.

CROSS REFERENCE TO RELATED APPLICATIONS

This application claims the benefit of Provisional U.S. Patent Application No. 60/876,928 filed Dec. 22, 2006.

BACKGROUND INFORMATION

1. Field

This disclosure generally relates to vacuum bags used in manufacturing and industrial processes, and deals more particularly with a device and method for detecting air leaks in a vacuum bag.

2. Background

Flexible vacuum bags are used in various manufacturing and industrial processes, such as the fabrication of composite structures and bonding of parts. For example, in the aerospace industry, without limitation, vacuum bags may be used to bond heat shield tiles to a metal backing. Vacuum bags may also used in vacuum bag molding, wherein a flexible bag formed from a polymer sheet such as Nylon® is placed over a part pre-form and sealed along a mold flange. A vacuum drawn in the bag eliminates entrapped air and excess resin, resulting in compaction of the pre-form. Similarly, vacuum assisted resin transfer molding (VARTM) may employ a vacuum bag to cover a pre-form or dry fabric on one-sided tooling. Air is evacuated and liquid resin from an external reservoir is drawn into the bag which is infused into the pre-form. Any leaks in the vacuum bag may allow air to enter and form bubbles in the resin matrix, resulting in an unacceptable amount of porosity in the matrix. Leaks in the vacuum bag may be relatively small and therefore difficult to observe by an operator. While various gas leak detection techniques are known, they are not always reliable and may not detect leaks quickly enough to be useful in repairing leaks while molding processes are underway.

Accordingly, there is a need for a leak detection system that allows instant detection of the location of leaks in the vacuum bag, without the use of complicated, external leak detection equipment or the need for highly experienced operating personnel. The disclosed embodiments are intended to satisfy this need.

SUMMARY

Leaks or pressure gradients may be detected in gas impermeable, transparent membranes used to maintain a pressure differential. The leaks or pressure gradients are detected by a gas permeable film or coating placed on or near the membrane that emits or reflects light of various wavelengths in the area of the leak or pressure gradient. Rapid visual detection of air leaks in vacuum bags for example, may be achieved using a leak detection film placed between the inside face of the vacuum bag, and a part or composite pre-form. The leak detection film may be applied directly to the inside face of the bag, or may comprise a separate membrane that is placed over the pre-form before the bag is sealed. The leak detection film includes a gas permeable binder incorporating gas sensitive materials that react to the presence of the gas. The gas sensitive material changes in appearance in response to exposure to gas caused by a leak in the bag. The change in appearance may comprise a local change in color or change in the intensity of a color in the area surrounding the leak.

According to one disclosed embodiment, a device is provided for indicating the location of an air leak in a vacuum bag used in processing parts, comprising a film including oxygen sensitive material inside of and extending across the bag, the oxygen sensitive material changing in physical appearance at the general location of an air leak in the bag. The film may include an oxygen permeable binder incorporating the oxygen sensitive material. The film may be bonded to an inside face of the bag and may be formed from a flexible polymer or paint that is applied to the bag. The oxygen sensitive material may include light sensitive nano-particles responsive to light of a predetermined wavelength for emitting light indicating the location of the air leak. The oxygen sensitive material may be excited by light of a pre-selected wavelength to luminescence; the intensity of the luminescence changes in the area of an air leak due to the presence of oxygen. A dye may be added to the film in order to color the luminescence of the film.

According to another disclosed embodiment, a vacuum bag assembly used in bonding parts together comprises: a vacuum bag covering at least one of the parts and defining a space in which a vacuum may be drawn to assist in bonding the parts; and, a leak detection film inside of and extending across the bag, the leak detection film including oxygen sensitive material that changes in physical appearance at the general location of an air leak in the bag.

According to further another disclosed embodiment, a device is provided for detecting an air leak in a vacuum bag used in fabricating composite parts, comprising a film inside of and substantially coextensive with the area of the bag subjected to a vacuum. The film includes an oxygen permeable binder and an oxygen sensitive material held in the binder. The oxygen sensitive material has at least one visual characteristic that changes in the presence of oxygen introduced into the vacuum bag by an air leak. The film may comprise a coating formed on the inside face of the bag. The oxygen sensitive material may include pressure sensitive luminophores.

According to a further embodiment, a vacuum molding bag is provided, comprising: a flexible, substantially transparent polymer sheet having an inside face and an outside face; and, a film on the inside face of the polymer sheet, the film including an oxygen permeable binder and an oxygen sensitive material held in the binder. The oxygen sensitive material exhibits a change in the physical appearance of the film in the area of an air leak in the molding bag, thereby indicating the location of the air leak. Portions of the film may be removable from the polymer sheet in order to tailor the geometry of the film relative to a seal which surrounds a part pre-form or other object to be subjected to a vacuum.

According to still another embodiment, a device is provided for use in manufacturing and industrial processes to detect gas leaks in a gas impermeable, transparent membrane. The device comprises means extending across the membrane for providing a visual indication of the location of a gas leak in the membrane. The means for providing a visual indication may include a film that changes in appearance in the area of the gas leak. The film may includes a gas permeable binder, and means held in the binder for visually reacting to the presence of a gas reaching the film through the leak. The film may be attached to the membrane, and may be substantially coextensive with an area on the membrane over which leaks are to be detected. The visually reacting means includes pressure sensitive luminophores.

According to another embodiment, a device is provided for detecting gas leaks in a seal between a vacuum processing bag and a base, comprising: a film inside of the processing bag and disposed adjacent the seal, the film including a gas permeable binder and a gas sensitive material held in the binder, the gas sensitive material having at least one visual characteristic that changes in the presence of gas entering the process bag through a leak in the seal. The film may extend substantially across the seal, and between the process bag and the base.

According to one disclosed method embodiment, processing a part using a vacuum bag comprises the steps of: placing the part on a base; placing a leak detection film over the part; placing a substantially transparent vacuum bag over the sheet of leak detection film; sealing the bag against air infiltration; drawing an vacuum in the bag; and, detecting an air leak in the bag by detecting the location of a change in appearance of the leak detection film resulting from air entering the bag. The method may further include the step of illuminating the bag with light having a wavelength that causes the leak detection film to luminesce so that changes in the intensity of the luminescence in the area of the air leak can be detected.

According to another method embodiment, fabricating a vacuum process bag allowing detection of air leaks in the bag, comprises the steps of forming a flexible polymer sheet and, applying a leak detection film on one face of the polymer sheet. The film may be applied by painting, printing or bonding the film on the face of the polymer sheet. The method may further comprise fabricating the film by extruding an oxygen permeable binder. The film may be fabricated by compounding an oxygen permeable binder and an oxygen sensitive material that changes in appearance when subjected to oxygen.

According to another method embodiment, a vacuum molding bag allowing detection of air leaks in the bag is fabricated by the steps comprising: forming a flexible polymer sheet; and, applying a leak detection film to one face of the polymer sheet. The leak detection film may be applied by painting, printing or bonding the film onto the face of the polymer sheet, or by co-extruding the film along with the polymer sheet.

According to a further method embodiment, a method of infusing a preform with resin, comprises the steps of: forming redundant vacuum chambers about the perform such that an inner vacuum chamber is disposed within an outer vacuum chamber; and if one of the vacuum chambers fails, the other vacuum chamber maintains vacuum integrity; evacuating the vacuum chambers such that the outer vacuum chamber has a pressure approximately equal to or greater than a pressure in the inner vacuum chamber; placing a leak detection film inside at least one of the inner and outer vacuum chambers; infusing resin into the preform while substantially maintaining the pressures in the vacuum chambers; and, detecting a leak in the at least one vacuum chamber by observing changes in the visual appearance of the leak detection film at the location of the leak.

Other features, benefits and advantages of the disclosed embodiments will become apparent from the following description of embodiments, when viewed in accordance with the attached drawings and appended claims.

BRIEF DESCRIPTION OF THE DRAWINGS

FIGS. 7 and 7a are sectional illustrations useful in explaining the removal of portions of the film extending beyond the vacuum seal.

FIG. 7b is a sectional illustration of an alternate embodiment in which the edge of the leak detection film is covered by a protective coating.

FIG. 15 is a flow diagram of aircraft production and service methodology.

FIG. 16 is a block diagram of an aircraft.

DETAILED DESCRIPTION

Figure 1:
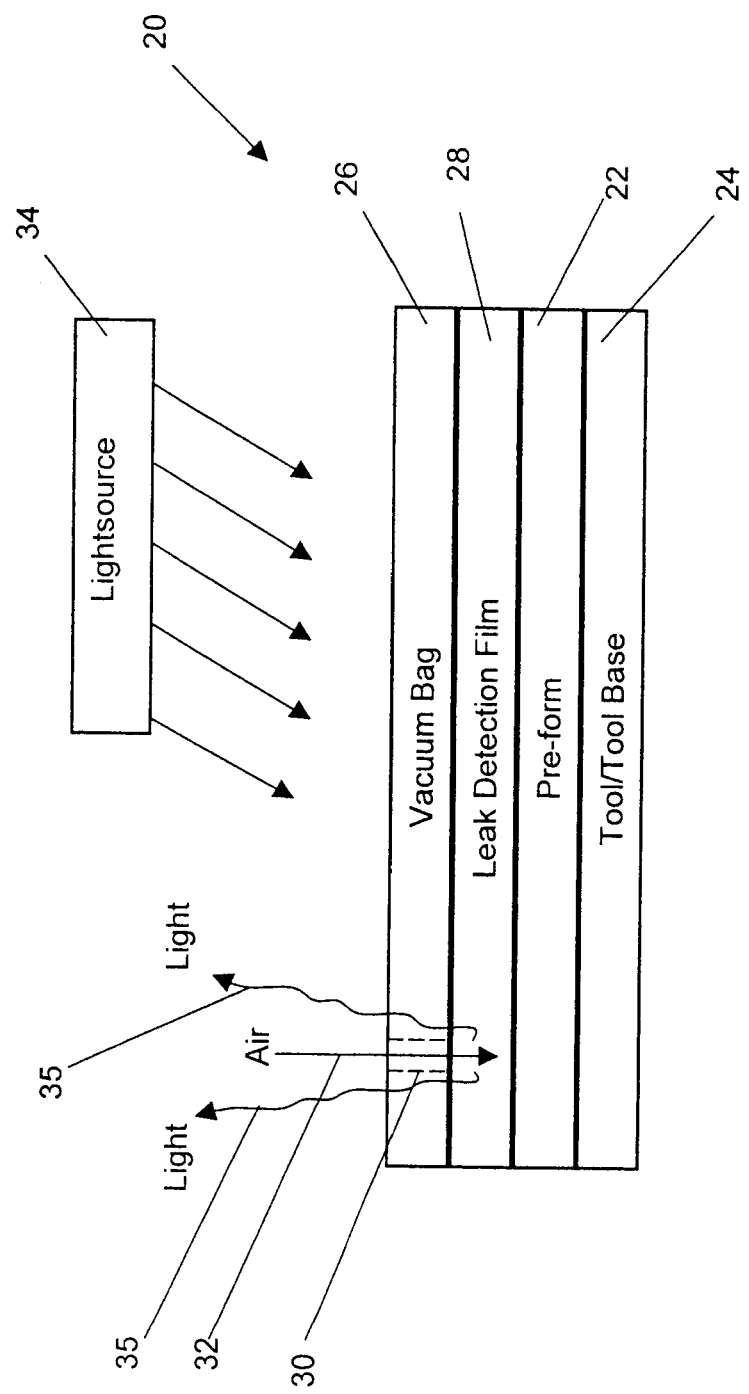
FIG. 1 is a functional block diagram illustrating a leak detection system for vacuum bags.
Figure 2:
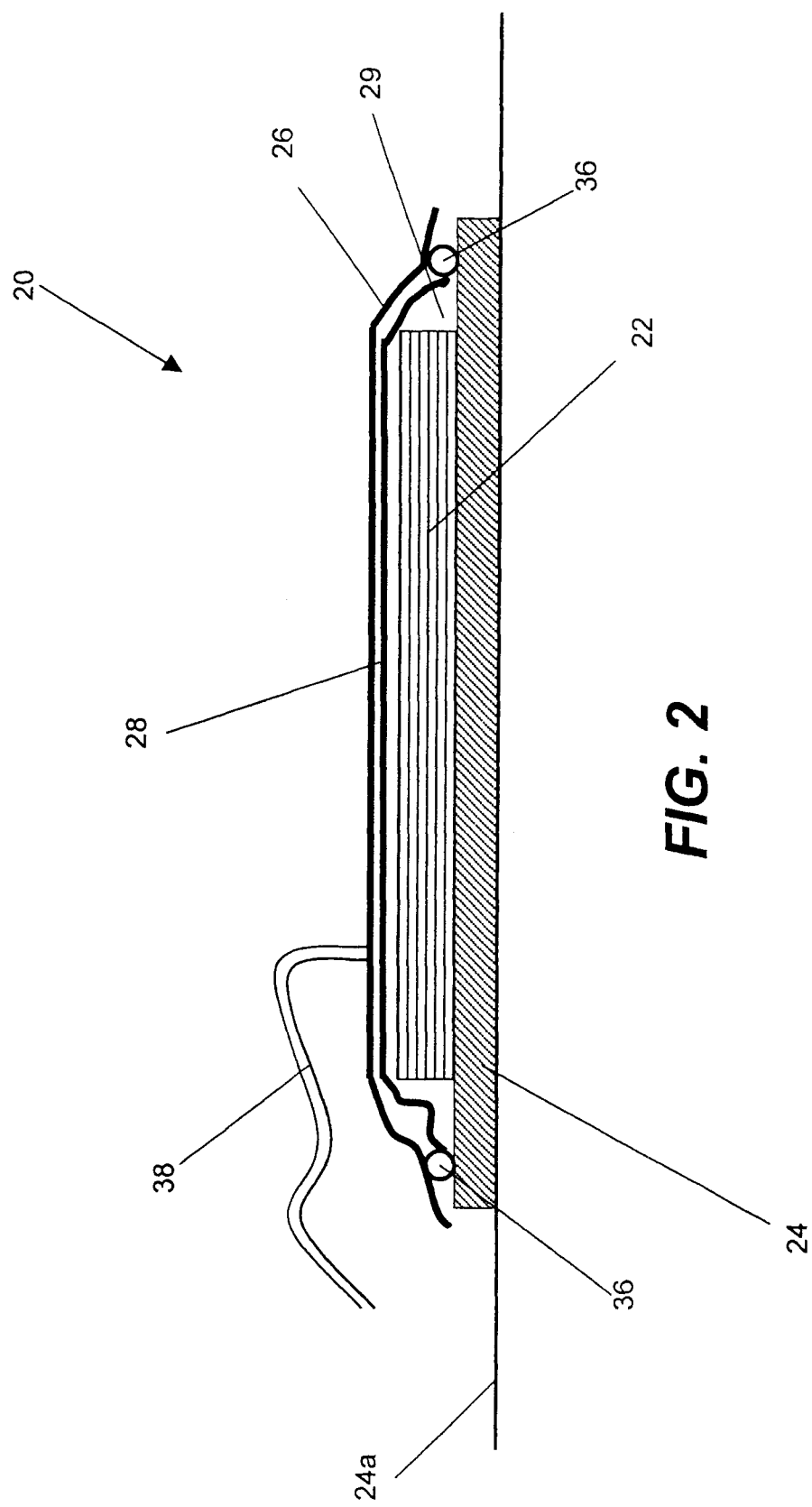
FIG. 2 is a cross sectional illustration of a molding assembly using a leak detection film.
Figure 3:
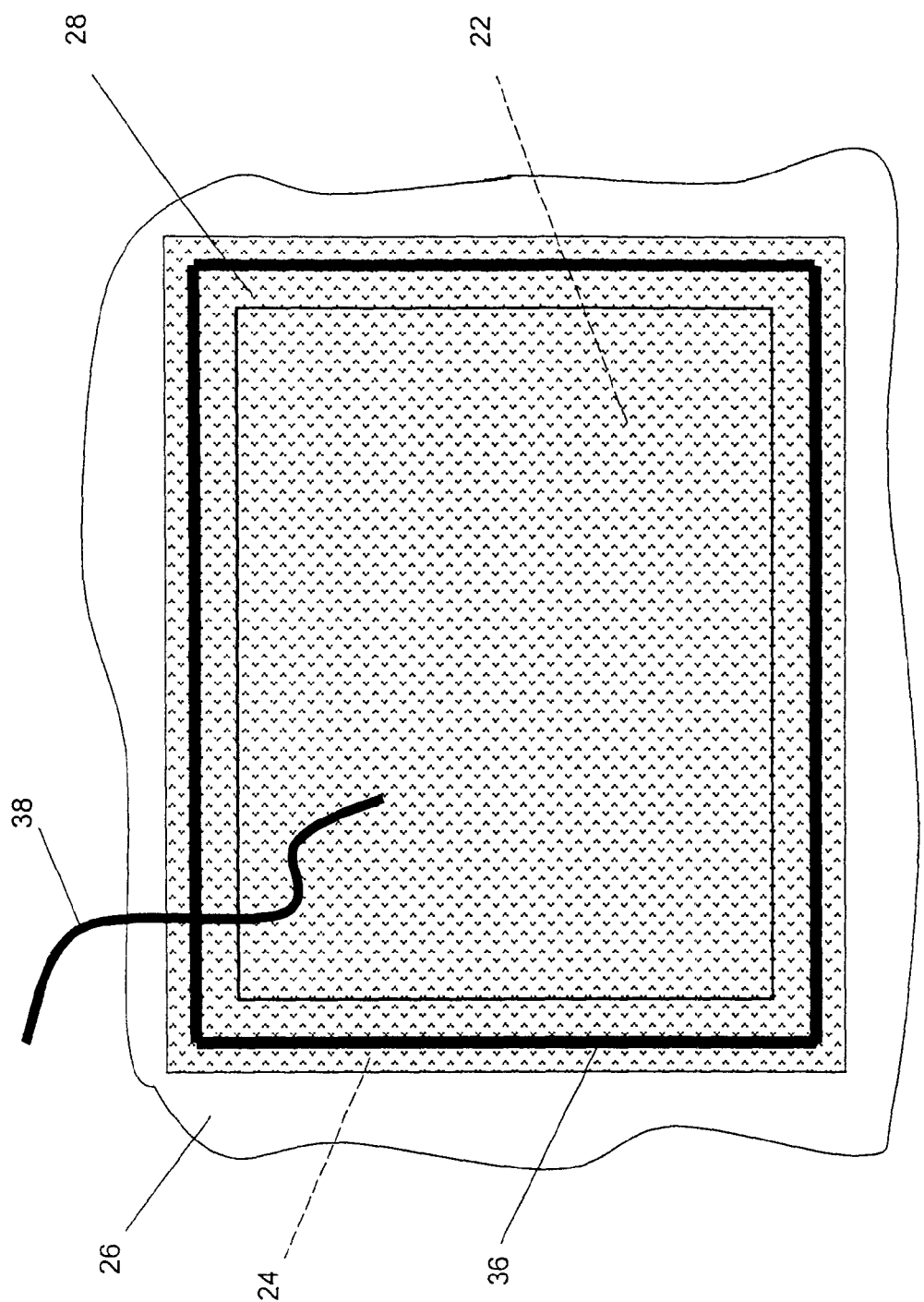
FIG. 3 is a plan view illustration of the assembly shown in FIG. 2.

Referring first to FIG. 1, a vacuum bag debulking composite part molding assembly 20 may be used to perform vacuum bag molding, vacuum assisted bonding of two parts together, often of dissimilar materials, or vacuum assisted resin transfer molding. A part pre-form 22 is placed on a molding tool and tool base 24. A heat shield tile or rubber pad or other material suitable for bonding may be used in certain applications instead of pre-form 22. A support surface onto which a heat shield tile, rubber pad or other material suitable for bonding may be used in certain applications instead of molding tool and tooling base 24. A layer of leak detection film (LDF) 28 may be either placed over the pre-form 22 or bonded/formed on the inside face of a vacuum bag 26.

As used herein, "LDF" refers to a layer of material that includes a binder or matrix incorporating a gas sensitive material which may be in molecular form; the layer may be in the form of a film, coating or a membrane. The vacuum bag 26 is placed over the pre-form 22 and sealed around its edges. A vacuum is drawn within vacuum bag 26 in order to compact the pre-form 22 and/or draw resin from a source (not shown) into the bag 26, which is then infused into the pre-form 22. An air leak 30 in the vacuum bag 26 may result in air 32 entering the evacuated space within the bag 26. The air 32 exposes the LDF 28 to oxygen at the location of the air leak 30.

As will be discussed in more detail below, the LDF 28 includes an oxygen sensitive material that reacts to oxygen in the incoming air 32 by changing its physical appearance, which is emitted or reflected from the LDF 28 as light 35. This change occurs generally only in the area of the air leak 32. Since the vacuum bag 26 may be substantially transparent, operating personnel may detect the location of the leak 30 by observing the changes in appearance of the LDF 28 around the area of the leak 30. The change in appearance of the LDF 28 may comprise, without limitation, a change in the color of the film 28 surrounding the air leak 30 or a change in the intensity of a color.

For example, LDF 28 may react to an atmospheric gas (oxygen) by changing color or growing darker or brighter. This reaction may be temporary so that the bag 26 may appear as red, when it is exposed to the air before it is used. Then, the bag 26 may change to a different color when it is evacuated. In the event of a bag leak, the area around the leak will remain red, enabling an operator to quickly detect and repair the leak. Alternatively the LDF 28 may contain, without limitation, a phosphorescent that emits different wavelengths of light 35 near a leak, or that changes in its intensity around a leak.

Depending upon the materials used, the LDF 28 may be exposed to a light source 34 which directs light of a particular wavelength, such as UV, onto the film 28. The incident light causes the oxygen sensitive material around the area of the leak 32 to luminesce (light 35), which may include either florescence or phosphorescence. The LDF 28 may include, for example, without limitation, so-called "pressure sensitive paints" which change color based on the oxygen partial pressure near the paint. The paint comprises luminophore molecules suspended in an oxygen permeable binder that are excited by light of a particular wavelength (e.g. blue), and then return to the ground state by emitting light of a different wavelength (e.g. red) if oxygen is present. The presence of oxygen causes the luminophore molecules to return to their ground state through oxygen-quenching. The intensity of the red light emitted is inversely proportional to the surrounding partial pressure of the oxygen.

It should be noted here that the use of the LDF 28 to detect leaks in vacuum bags 26 is merely illustrative of a wide range of applications of the LDF 28 in industrial and manufacturing processes where it is desired to detect leaks or pressure gradients in gas impermeable, transparent membranes used to maintain a pressure differential. While the disclosed embodiments of the LDF employ materials that react to the presence of oxygen contained in the air, in order to detect leaks in vacuum bags, the LDFs may be used to detect the presence of various other gases, depending on the application. It should be further noted that the change in appearance of the LDF 28 may occur as the result of changes in light reflected from the surface of the LDF 28, the emission of light from the LDF 28 triggered by incident light of particular wavelengths or even chemical reactions resulting from the exposure of the LDF 28 to a particular gas.

Attention is now directed to FIGS. 2-5 which disclose further details of the composite part molding assembly 20. The pre-form 22 is placed on a tool 24 supported on a tool base 24a. In the illustrated embodiment, a membrane-like LDF 28a is placed over the pre-form 22 and tool 24. A conventional vacuum bag 26 is spread over the LDF 28 so that the inside face of the bag 26 is in close proximity to or contacts the LDF 28. In order that leaks may be detected over the entire area of the bag 26 in which a vacuum is drawn, the outer margins of the LDF 28 may extend out to the edge of a seal 36, so that the LDF 28 is substantially coextensive with the evacuated area of the bag 26.

The outer margins of the bag 26 are attached to the seal 36 that forms an air tight boundary to tool 24 around the perimeter of the bag 26. Sealed bag 26 encloses a volume 29 between bag 26 and tool 24 which is supported on tool base 24a. One or more vacuum lines 38 may connect to the bag 26 in order to connect bag 26 to a vacuum source to evacuate the bag. In the case of a VARTM process, additional lines (not shown) may be used to connect the bag 26 with a source of resin (not shown) that is drawn into the bag 26 by the vacuum.

Figure 4:
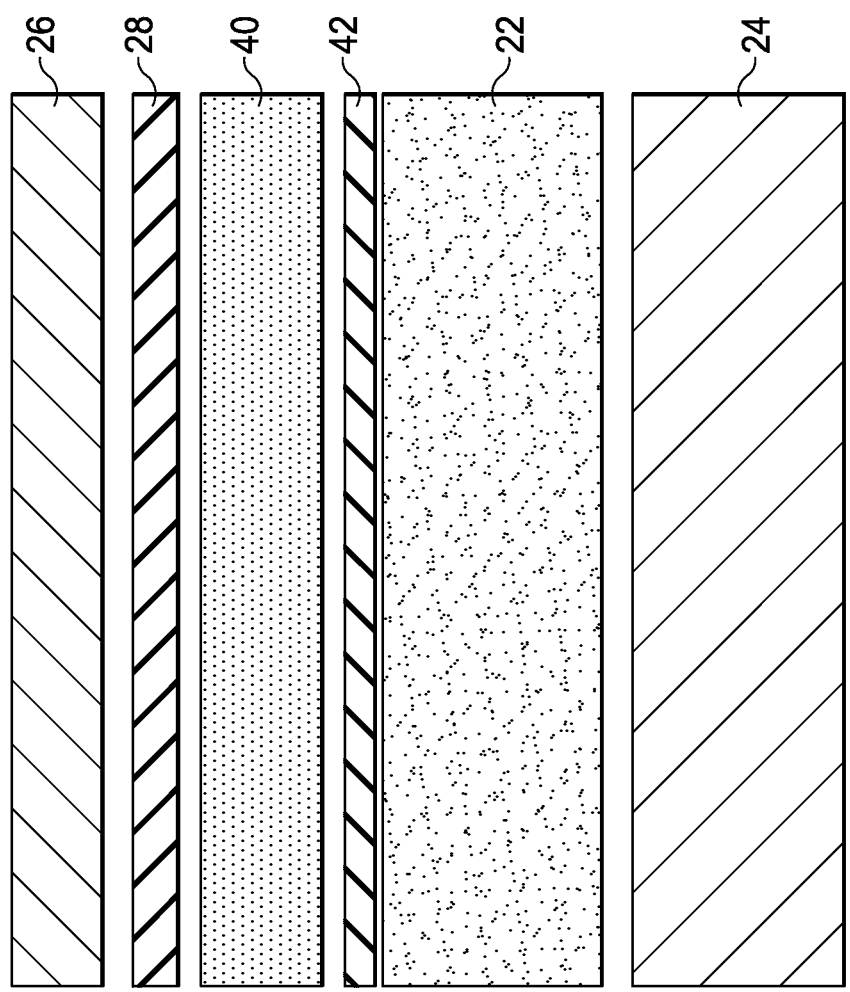
FIG. 4 is an exploded, sectional illustration of the components of a vacuum molding assembly including one embodiment of the leak detection film.

As best seen in FIG. 4, the bag 26 may comprise a flexible polymer film, such as Nylon®, Kapton® or PVA (polyvinyl alcohol) that is substantially transparent and impermeable to gases. The LDF 28 comprises a gas permeable binder incorporating oxygen sensitive material such as luminophores or other similar materials that may be triggered to emit radiation as a reaction to the presence of oxygen. The oxygen sensitive material may also comprise, for example, light sensitive nano-particles that detect the presence of oxygen only when they are "switched on" by light of a particular wavelength, such as ultraviolet (UV) light. The pre-form 22 may be covered by a release ply 42 and a breather layer 40 used in those applications where the pre-form 22 is composed of prepreg. In the case of a dry pre-form 22 that is to be infused by resin, layer 40 may comprise flow media, rather than a breather. As will be discussed later in more detail, the LDF 28 may comprise a plastic or other binder material used to hold the oxygen sensitive materials. The LDF 28 may be cast, extruded or fabricated by other conventional fabrication processes.

Figure 5:
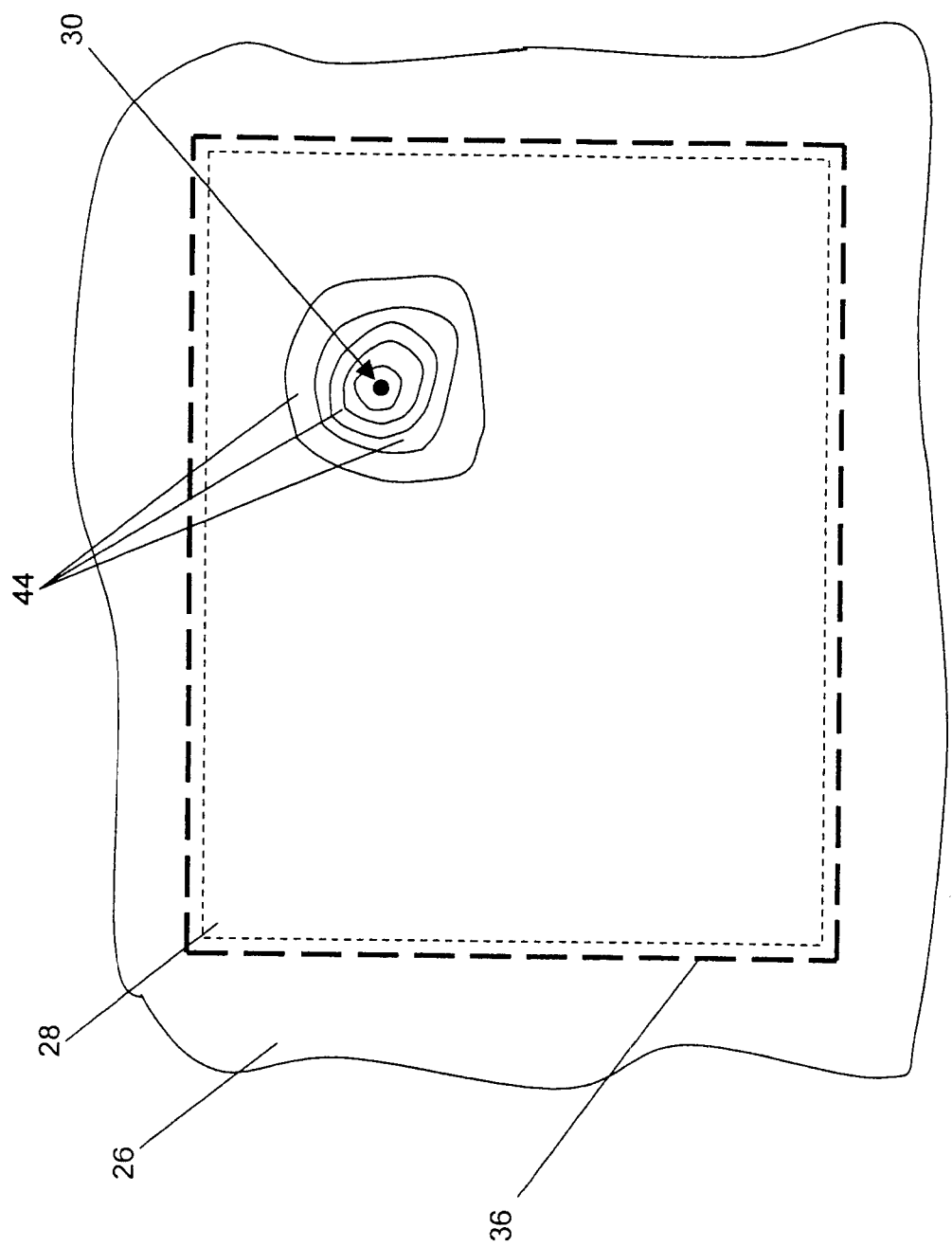
FIG. 5 is a plan view illustration of a vacuum bag and leak detection film, showing the location of an air leak in the bag.

As previously described, depending upon the materials used as the oxygen sensitive material in the LDF 28, a leak 30 in the bag 26 allows air to enter the bag 26 which exposes the LDF 28 to oxygen in the area surrounding the leak 30. The oxygen sensitive material reacts to the presence of the entering air by changing color or changing the intensity of its current color. Other physical changes in the LDF 30 that are visibly detectable may be possible, depending upon the materials used. The degree of change in the physical appearance (color) may depend upon the pressure of the air (and thus the oxygen) entering the leak 30. Generally, the change in physical appearance of the LDF 28 around the air leak 30 will diminish with increasing distance from the air leak 30. Thus, as shown in FIG. 5, the change in physical appearance of the LDF 28 may take the form of muted bands 44 having different colors surrounding the air leak 30.

As previously described, the leak detecting film 28 may comprise materials similar to known materials referred to as pressure sensitive paints which comprise two primary parts: an oxygen-sensitive florescent molecule and an oxygen-permeable binder. The detection process is based on the sensitivity of the luminescent molecules to the presence of oxygen. When a luminescent molecule absorbs a photon, it is excited to an upper singlet energy state. The molecule then typically recovers to the ground state by the admission of a photon of a longer wavelength.

In some materials, oxygen can interact with the molecules such that the transition to the ground state is without radiation; this process is known as oxygen quenching. The rate at which these two processes compete may depend upon the partial pressure of the oxygen present, with a higher oxygen pressure quenching the molecule to a greater extent, thus diminishing the intensity of the light. It should also be noted here that the luminescence intensity of the LDF 28 at a given point may also a function of other factors. For example, the luminescence intensity may depend on variations in the spatial distribution of the illumination over the LDF 28, the level of concentration of the luminospheres, the thickness of the LDF 28 and the sensitivity of any cameras that may be used to detect visual changes in the LDF 28.

Depending upon the particular materials used in the LDF 28, specialized recording instruments may not be necessary in order to detect luminescent emissions produced by the oxygen sensitive molecules. For example, by doping the materials in the film 28 with adequate substances, a luminescence emission in the visible range may be obtained which is oxygen sensitive.

Figure 6:
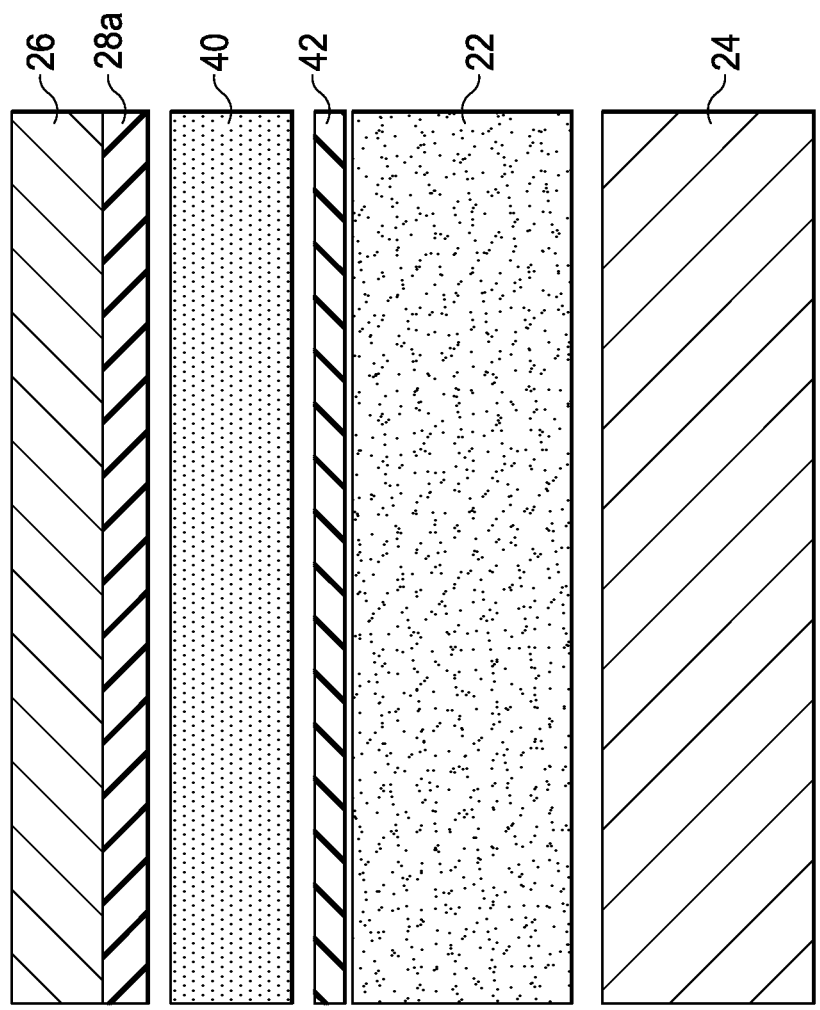
FIG. 6 is a sectional illustration similar to FIG. 4 but showing an alternate form of the film applied to the vacuum bag.

FIG. 6 illustrates an arrangement in which another embodiment of the LDF 28a is adhered to the inside face of the bag 26. As will be discussed below, the LDF 28a may comprise a separate sheet of material that is bonded to the bag sheet 26. Alternatively, the bag 26 and LDF 28a may be co-extruded so as to form a double layer, single sheet of material. Further, LDF 28a may comprise a paint or ink that is sprayed or printed onto the bag 26. Where the LDF 28a is in the form of a paint or ink, it should have sufficient flexibility to generally match the flexibility of the bag 26. It may also be desirable to generally match the coefficients of thermal expansion (CTE) of the bag 26 and the LDF 28.

Where the LDF 28a is adhered directly to the inside face of the bag 26, it may be important to assure that the film 28a does not extend beyond the seal 36. For example, as shown in FIG. 7, allowing the LDF 28a to extend beyond the seal 36 exposes a portion 31 of the LDF 28a to outside air 46 which may then enter the LDF 28a, pass through the plane of the LDF 28a and may be released inside the bag 26. Accordingly, the LDF 28a should be truncated inside of the seal 36, as illustrated in FIG. 7a, but preferably as close to the seal 36 as possible. Alternatively, as illustrated in FIG. 8, it may be possible to apply a gas impervious coating 45 over any portions 31 of the LDF 28a that extend beyond the seal 36 in order to prevent air from entering the bag 26 through the edges of the LDF 28a.

Figure 7C:
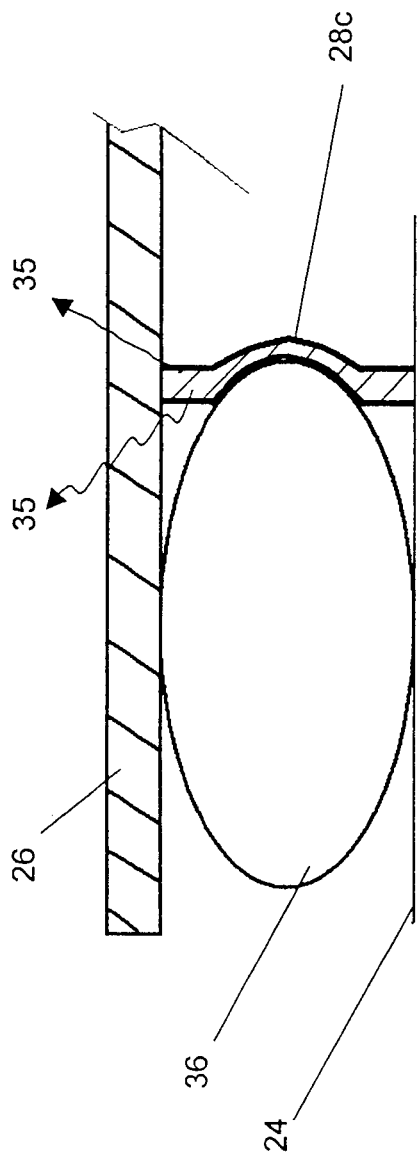
FIG. 7c is a sectional illustration of an alternate embodiment in which a leak detection film is positioned to detect leaks in a bag seal.

FIG. 7c illustrates an alternate embodiment in which a short length of LDF 28c is positioned between the bag 26 and the tool 24, immediately adjacent the bag seal 36. Positioning LDF 28c across the seal 36 allows an operator to detect leaks in the seal 36, since a leak in the seal 36 may be detected by the LDF 28 which will emit light 35 near the edge of the seal 36. The LDF 28c may be used with or without a separate LDF 28 employed to detect leaks in the bag 26. The oxygen sensitive material used in the LDF 28c may produce a color different from the color emitted by an LDF 28 used to detect leaks in the bag 26, thus allowing an operator to distinguish between leaks in the seal 36 and leaks in the bag 26. It should be noted here that the LDF 28c need not be sealed against either the bag 26 or the tool 24.

Figure 7D:
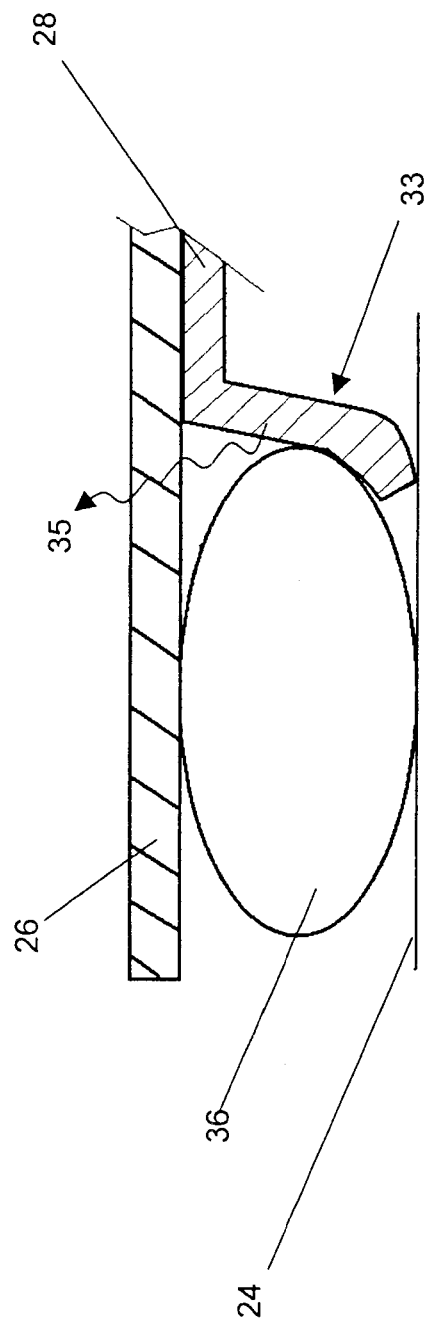
FIG. 7d is a sectional illustration of an alternate embodiment in which an edge of the leak detection film is positioned to detect leaks in a bag seal.

FIG. 7d illustrates an alternate embodiment which may allow detection of leaks in the seal 36. The edge 33 of an LDF 28 extends from the inner surface of the bag adjacent the seal 36, downwardly to the tool 24, thereby effectively covering the edge of the seal 36. The edge 33 need not be sealed to the tool 24. A leak in the seal 36 may result in light 35 being emitted or reflected from the LDF 28 near the seal 36, thereby alerting an operator that a leak may be present in or near the seal 36.

Figure 9:
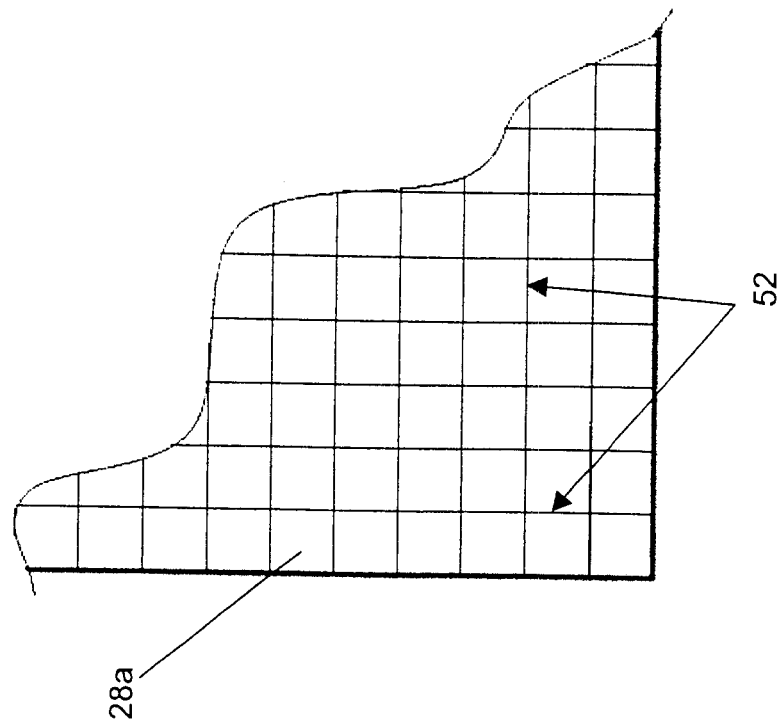
FIG. 9 is a plan illustration of a section of an alternate embodiment of the leak detection film in which a grid of pre-formed lines of weakness are formed in the film.
Figure 8:
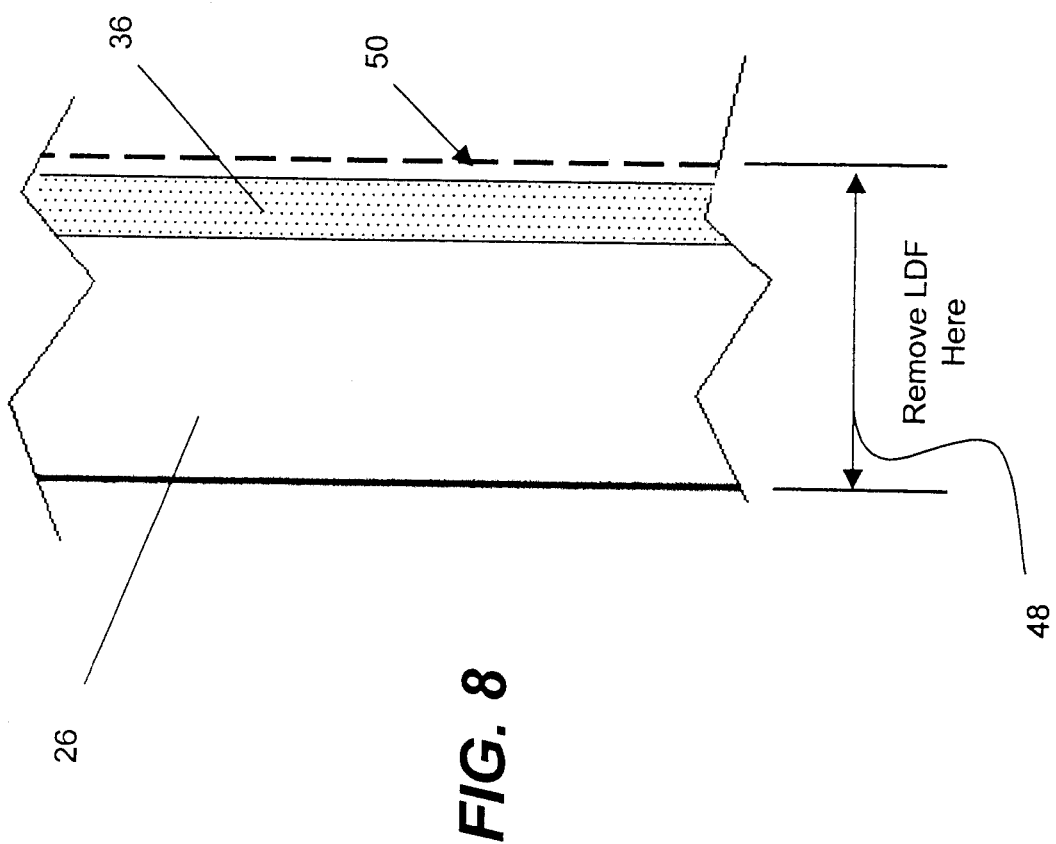
FIG. 8 is a plan illustration of an edge of the vacuum bag, showing the area where the leak detection film may be removed.

FIG. 8 illustrates a marginal area 48 of the bag 26 in which a portion of the LDF 28a is removed. Where the film 28a is painted or printed onto the surface of the bag 26, chemicals or etchants may be used to remove the LDF 28a in the marginal areas 48. For example, where the LDF 28 is an acrylic paint, portions of it may be removed from the bag 26 using acetone. Also, areas of the bag 26 may be masked off during the painting or printing process to define the outer boundaries of the LDF 28.

Where the LDF 28a is coextruded with the bag 26 or is bonded to the bag 26, it may be possible to cut away and remove the marginal portions of the LDF 28a. FIG. 9 illustrates an arrangement for removing the marginal portions 48 of the film 28. During manufacture of LDF 28a, preformed lines of weakness 52 may be produced in the film 28a, in the form of a grid pattern. The preformed lines of weakness 52 allow an operator to remove the marginal portions 48 by simply tearing them away from the bag 26 along the gridlines. Similarly, strips on the bag 27 forming a grid pattern may be left uncoated by the LDF 28 to allow a technician to seal the bag 28 along any of the strips.

Figure 10:
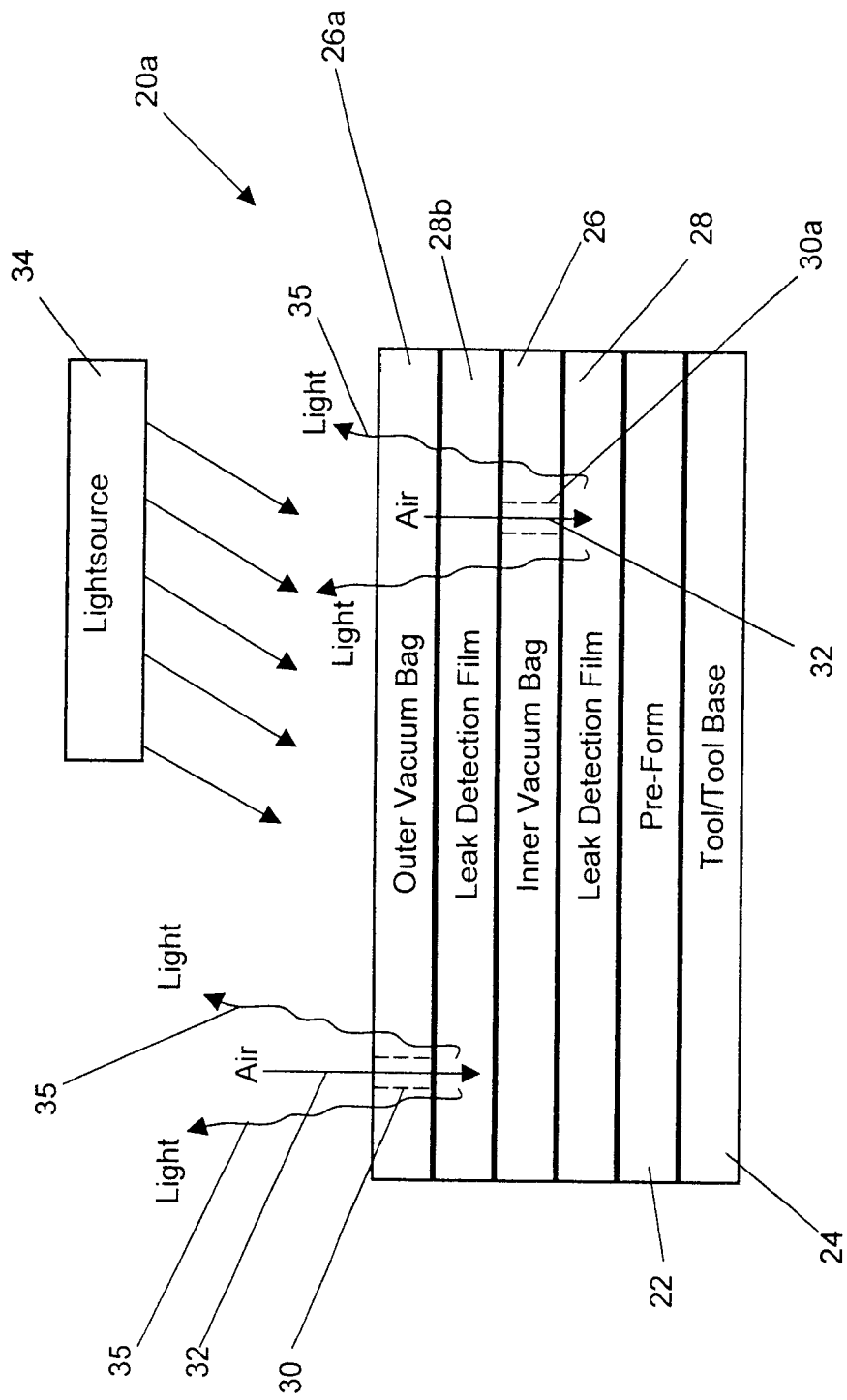
FIG. 10 is a functional block diagram similar to FIG. 1, but showing an embodiment used to detect leaks in a process employing double vacuum bags.

The LDF 28 may be employed to detect leaks in multiple vacuum bags or bag assemblies. For example, a double bag molding assembly 20a is show in FIG. 10 which uses a pair of vacuum bags 26, 26a. Vacuum bag 26 forms an air tight cover over the pre-form 22, similar to the arrangement shown in FIG. 2. The second vacuum bag 26a forms an air tight cover over the first vacuum bag 26 so that the entire area of the first bag 26 is contained with a vacuum chamber defined by the volume within the second bag 26a. The second bag 26a forms redundancy that assures that a vacuum is maintained over the pre-form 22 in the event of an air leak in the first bag 26. The second bag 26a may also function to equalize the pressure applied over the area of the first bag 26, so that resin is more evenly infused into the pre-form 22. LDFs 28, 28a are positioned inside the bags 26, 26a respectively to detect bag leaks.

Figure 11:
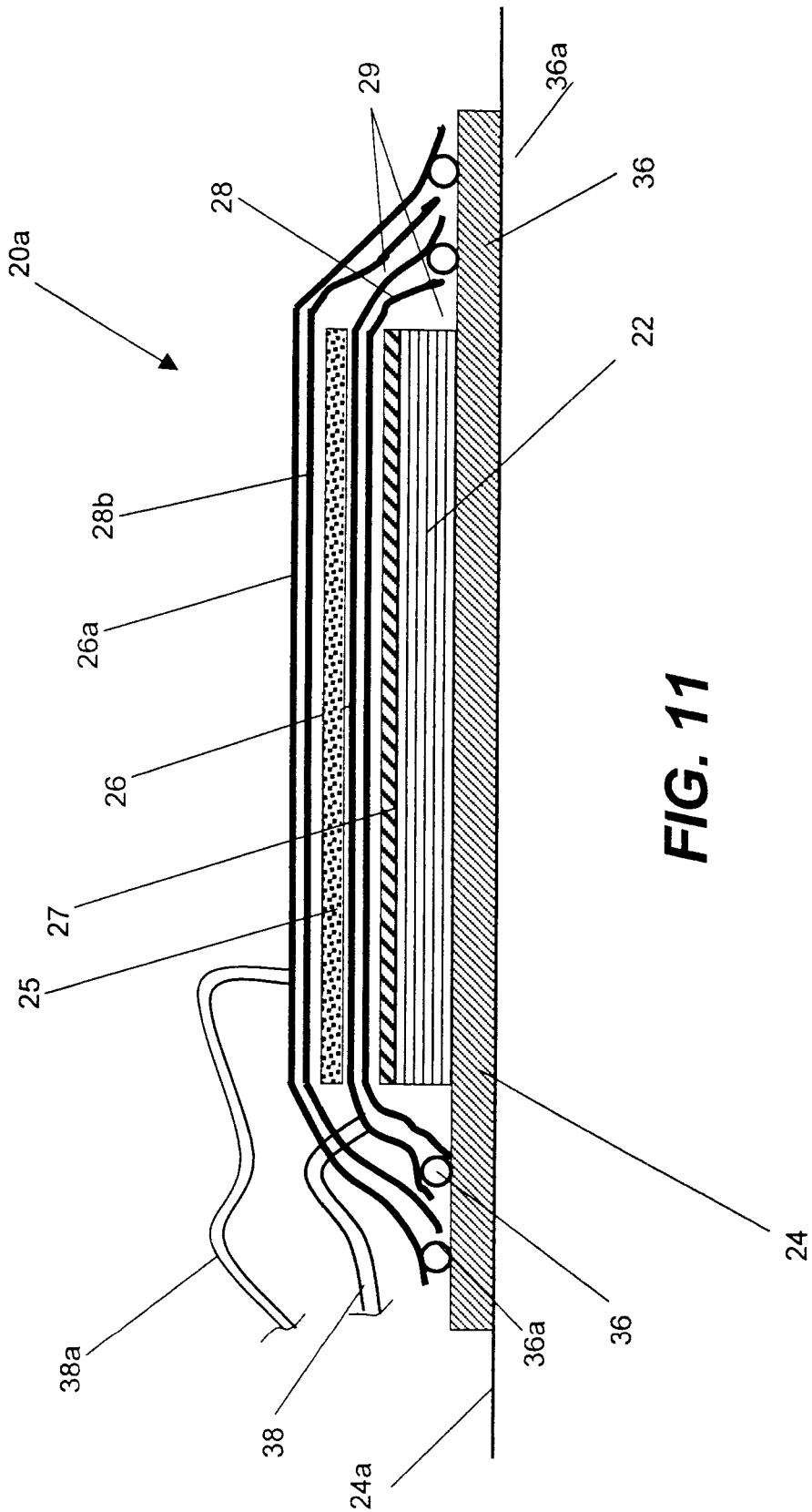
FIG. 11 is a cross sectional illustration similar to FIG. 2, but showing an embodiment used to detect leaks in a process employing double vacuum bags.

FIG. 11 illustrates details of a double bag VARTM molding assembly 20a. Flow control media 27 is positioned over the pre-form 22, and the first LDF 28 is positioned between the flow control media 27 and the inner bag 26, which is sealed to the tool 24 by an inner seal 36. The second LDF 28b is placed between the inner bag 26 and the outer bag 26a which is sealed to the tool 24 by an outer seal 36a and is coupled to a vacuum line 38a. LDF 28 detects leaks in the inner bag 26, while LDF 28b independently detects leaks in the outer bag 26a. Alternatively, only one of the bags 26, 26b may be provided with an LDF 28, 28b. An optional breather 25 may be placed between the LDF 28b and the inner bag 26. Both the breather 25 and the LDF 28b may be substantially transparent so that an operator may observe changes in the appearance of the LDF 28 caused by a leak in the inner bag 26. The oxygen sensitive materials used in the LDFs 28, 28b may be different or may be doped to produce different colors or intensities so that an observer can distinguish between leaks in the inner bag 26 and leaks in the outer bag 26a.

Figure 12:
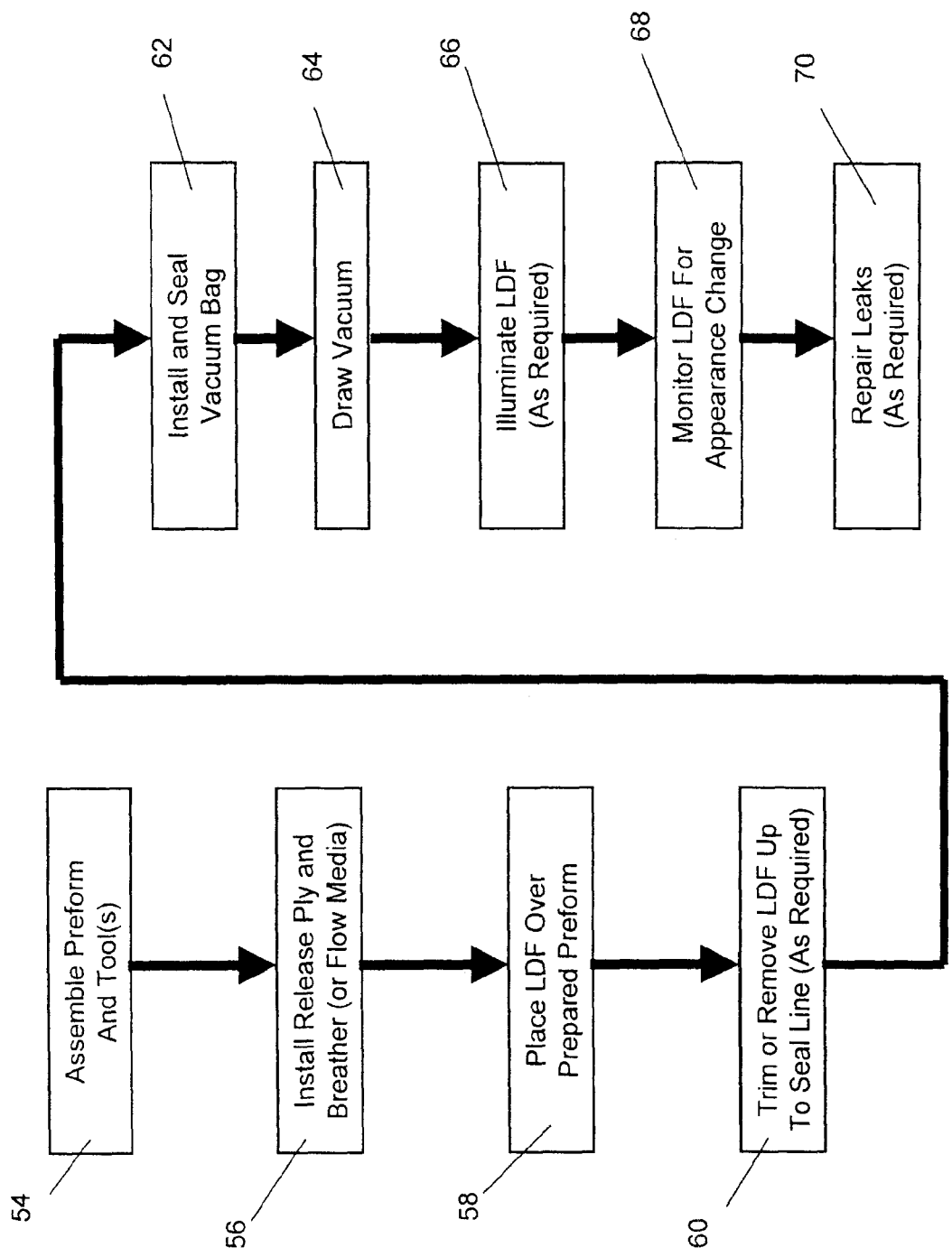
FIG. 12 is a flow diagram illustrating the steps for molding composite parts using the leak detection film.

Attention is now directed to FIG. 12 which illustrates the steps of a method for performing vacuum bag molding using the leak detection system described above. Beginning at step 54, the pre-form 22 and tool 24 are assembled, following which a release ply 42 and a breather or flow media 40 are placed over the pre-form 22, as shown at step 56. Next, the LDF 28 is placed over the prepared pre-form 22. Then, at step 60, the LDF 28 is trimmed or removed up to the edge of the seal 36, as may be required. At step 62, the vacuum bag 26 is installed over the pre-form 22 and the LDF 28, and then sealed. Next, at step 64 a vacuum is drawn, and the LDF 28 may be illuminated with a light source having a wavelength that triggers luminescent emissions from the oxygen sensitive molecules in the LDF 28. At step 68, the LDF is monitored for changes in appearance, such as changes in intensity or color in the area surrounding air leaks. Finally, at step 70, air leaks in the bag are repaired.

Figure 13:
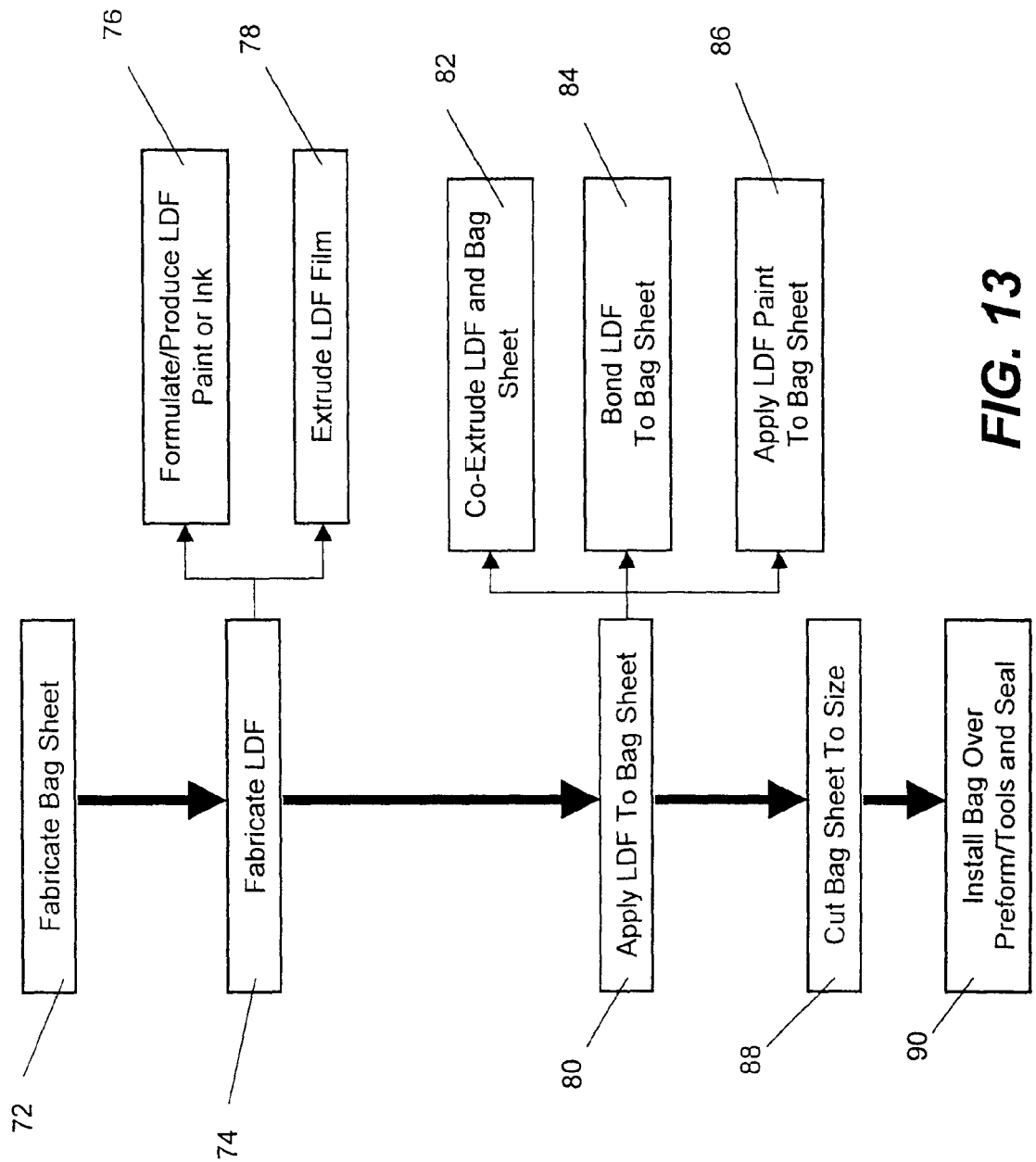
FIG. 13 is a flow diagram illustrating the steps of forming the bag and the leak detection film.

FIG. 13 illustrates the steps of alternate processes for producing the LDF 28 for vacuum bags. Beginning at step 72, a vacuum bag 26 is fabricated using sheets of polymer material, such as Nylon®. Next, the LDF 28 is fabricated as shown at step 74. This fabrication step may involve formulating and producing LDF paint or ink at step 76, or extruding the film, as shown at step 78.

Next, at step 80, the LDF 28 may be applied to the bag 26 by any of several processes. First, the LDF 28 may be coextruded with the bag, as shown at step 82. Alternatively, the LDF 28 may be bonded directly to the bag 26 as shown at step 84. Finally, the LDF 28 may be applied to the bag 26 either by painting or printing as shown at step 86. The bag 26 having the LDF 28 applied thereto is cut to size at step 88 and then installed over the pre-form 22 and tool 24, and sealed at step 90.

Figure 14:
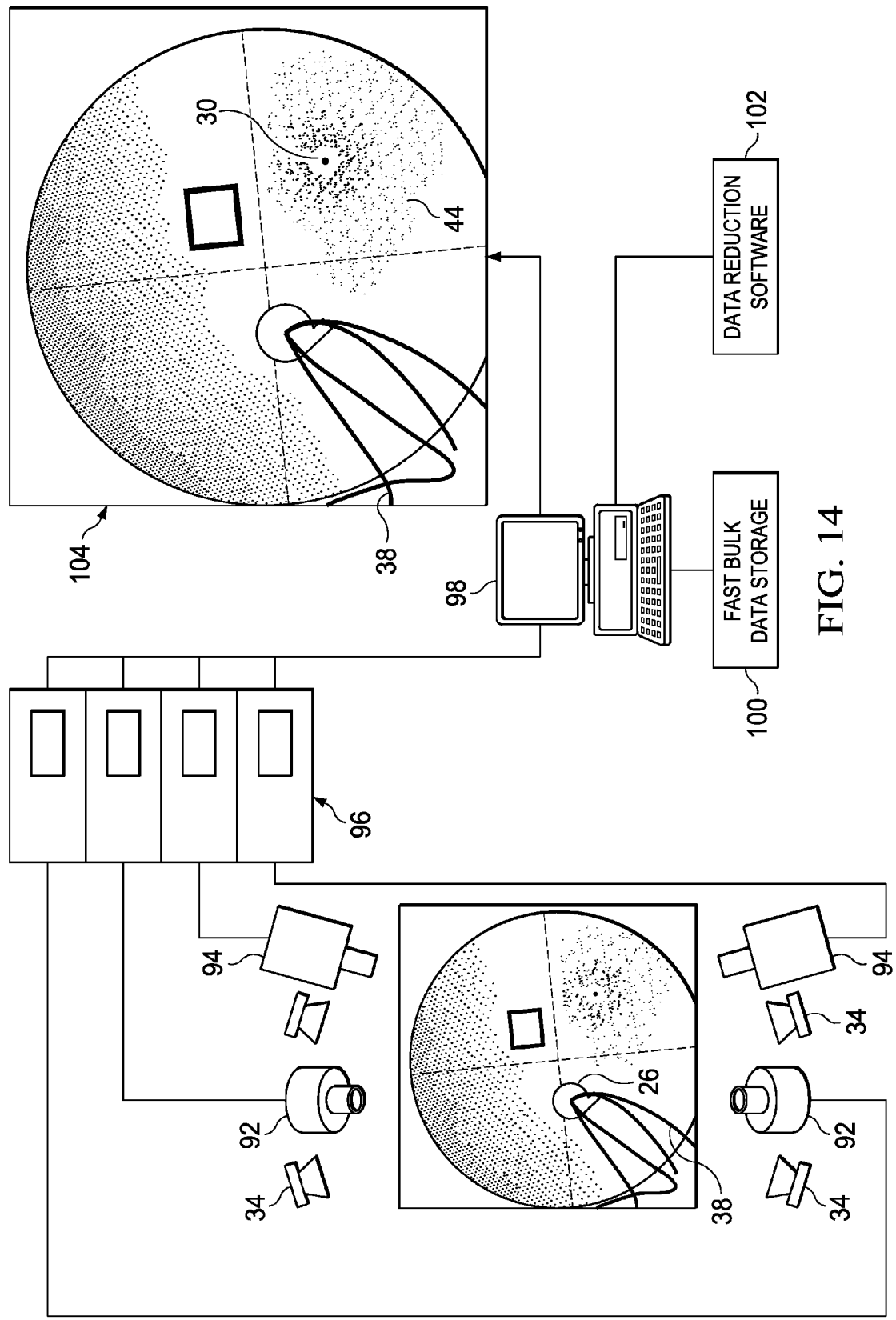
FIG. 14 is a diagrammatic illustration of a system for detecting leaks in vacuum bags.

Attention is now directed to FIG. 14 which depicts a system that may be used for detecting air leaks in vacuum bags. Multiple excitation lights 34 direct light of a predefined wavelength, over to the surface of the bag 26. In one embodiment, the lights 34 may have a wavelength of 450 nm (blue). The lights 34 may include suitable filters if needed and may operate continuously or as strobes. CCD cameras 92 with suitable filters as appropriate view the surface of the bag 26. Signals from the cameras 92 are fed to camera drivers 96 which deliver recorded camera information to a PC-based work station 98. The work station 98 may include fast bulk data storage 100 and commercially available, data reduction software 102. The work station 98 may be used to display an image 104 representing images recorded by cameras 92. As can be seen in FIG. 14, image 104 reveals a pin hole air leak 30 in the bag 26 which is highlighted by contrasting colors 44 surrounding the leak 30.

Referring now to FIGS. 15 and 16, embodiments of the disclosure may be used in the context of an aircraft manufacturing and service method 106 as shown in FIG. 15 and an aircraft 122 as shown in FIG. 16. During pre-production, exemplary method 106 may include specification and design 108 of the aircraft 122 and material procurement 110. During production, component and subassembly manufacturing 112 and system integration 114 of the aircraft 122 takes place. Thereafter, the aircraft 122 may go through certification and delivery 116 in order to be placed in service 118. While in service by a customer, the aircraft 122 is scheduled for routine maintenance and service 120 (which may also include modification, reconfiguration, refurbishment, and so on).

Each of the processes of method 106 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 122 produced by exemplary method 106 may include an airframe 124 with a plurality of systems 128 and an interior 126. Examples of high-level systems 128 include one or more of a propulsion system 130, an electrical system 134, a hydraulic system 132, and an environmental system 136. Any number of other systems may be included. Although an aerospace example is shown, the principles of the disclosed embodiments may be applied to other industries, such as the automotive industry.

The apparatus embodied herein may be employed during any one or more of the stages of the production and service method 106. For example, components or subassemblies corresponding to production process 112 may be fabricated or manufactured in a manner similar to components or subassemblies produced while the aircraft 122 is in service. Also, one or more apparatus embodiments may be utilized during the production stages 112 and 114, for example, by substantially expediting assembly of or reducing the cost of an aircraft 122. Similarly, one or more apparatus embodiments may be utilized while the aircraft 122 is in service, for example and without limitation, to maintenance and service 120.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A device, comprising:
  a vacuum bag;
  a film including oxygen sensitive material inside of and extending substantially entirely across the vacuum bag, the oxygen sensitive material changing in physical appearance at the general location of an air leak in the vacuum bag;
  a pre-form composite part disposed inside the vacuum bag; and
  a tool base on which the pre-form composite part is placed.

2. The device of claim 1, wherein the film includes:
  an oxygen permeable binder, and
  wherein the oxygen sensitive material is held in the oxygen permeable binder.

3. The device of claim 1, wherein the film is bonded to an inside face of the vacuum bag.

4. The device of claim 1, wherein the film is formed from a flexible polymer.

5. The device of claim 1, wherein the oxygen sensitive material includes light sensitive nanoparticles responsive to light of a predetermined wavelength for emitting light indicating the location of the air leak in the vacuum bag.

6. The device of claim 1, wherein the oxygen sensitive material may be excited by light of a preselected wavelength to luminesce, and the intensity of the luminescence changes due to the presence of oxygen caused by the air leak.

7. The device of claim 6, wherein the film includes a dye for coloring the luminescence produced by the oxygen sensitive material.

8. The device of claim 1, wherein the film is substantially coextensive with the region of the vacuum bag that is subjected to a vacuum.

9. The device of claim 1, wherein the oxygen sensitive material includes pressure sensitive luminophores.

10. The device of claim 1, wherein the parts include a vehicle subassembly.

11. The device of claim 1, wherein the vacuum bag is used to process aircraft subassemblies.

12. A device, comprising:
  a plurality of vacuum bags, wherein the plurality of vacuum bags comprises a first vacuum bag and a second vacuum bag, the second vacuum bag inside the first vacuum bag;
  a first film inside of and substantially coextensive with a first area of the first vacuum bag subjected to a vacuum, the first film including a first oxygen permeable binder and a first oxygen sensitive material held in the first oxygen permeable binder, the first oxygen sensitive material having at least one visual characteristic that changes in the presence of oxygen introduced into the first vacuum bag by a first air leak;
  a second film inside of and substantially coextensive with a second area of the second vacuum bag subjected to a vacuum, the second film including a second oxygen permeable binder and a second oxygen sensitive material held in the second oxygen permeable binder, the second oxygen sensitive material having at least one visual characteristic that changes in the presence of oxygen introduced into the second vacuum bag by a second air leak;

a pre-form composite part disposed inside the second vacuum bag; and a tool base on which the pre-form rests.

13. The device of claim 12, wherein the first film includes a first coating formed on an inside face of the first vacuum bag and the second film includes a second coating formed on an inside face of the second vacuum bag.

14. The device of claim 12, wherein the first oxygen sensitive material includes light sensitive nanoparticles responsive to light of a first predetermined wavelength for emitting light indicating the location of the first air leak and the second oxygen sensitive material includes light sensitive nanoparticles responsive to light of a second predetermined wavelength for emitting light indicating the location of the second air leak.

15. The device of claim 12, wherein the first oxygen sensitive material is excited by light of a first preselected wavelength to luminesce, wherein the presence of oxygen caused by the first air leak produces a change in the luminescence, and further wherein the second oxygen sensitive material is excited by light of a second preselected wavelength to luminesce, wherein the presence of oxygen caused by the second air leak produces a change in the luminescence.

16. The device of claim 15, wherein the first film includes a first dye for coloring the luminescence of the first oxygen sensitive material, and wherein the second film includes a second dye for coloring the luminescence of the second oxygen sensitive material.

17. The device of claim 12, wherein the first oxygen sensitive material and the second oxygen sensitive material each includes pressure sensitive luminophores.

18. A method comprising:

placing a pre-form composite part on a tool base;

placing a device over the pre-form composite part, wherein the device comprises a vacuum bag and a film including an oxygen sensitive material inside of and extending substantially entirely across the vacuum bag, and wherein the oxygen sensitive material is configured to change in physical appearance at a general location of an air leak in the vacuum bag;

sealing the vacuum bag against air infiltration;

drawing a vacuum in the vacuum bag; and detecting the air leak in the vacuum bag by detecting the location of a change in physical appearance of the film resulting from air entering the vacuum bag.

19. A device, comprising:

a transparent vacuum bag;

a seal located beneath the transparent vacuum bag;

a film inside of the transparent vacuum bag and disposed adjacent the seal, the film including a gas permeable binder and a gas sensitive material held in the binder, the gas sensitive material having at least one visual characteristic that changes in the presence of gas entering the transparent vacuum bag through a leak in the seal;

a pre-form composite part disposed inside the vacuum bag; and a tool base on which the pre-form composite part is placed.

20. The device of claim 19, wherein the film extends substantially entirely across the seal.

21. The device of claim 19, wherein the gas sensitive material includes pressure sensitive luminophores.

22. The device of claim 19, wherein the gas is oxygen.

23. The device of claim 19, wherein the film extends over an area of the bag and includes marginal portions disposed adjacent to the seal.

* * * * *